(12) United States Patent
Fenile et al.

(10) Patent No.: US 11,299,350 B2
(45) Date of Patent: Apr. 12, 2022

(54) TRANSPORT BAG FOR SUSPENDED CONVEYOR SYSTEMS

(71) Applicant: FERAG AG, Hinwil (CH)

(72) Inventors: Roberto Fenile, Wetzikon (DE); Martin Ruge, Starrkirch-Wil (DE)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/999,258

(22) Filed: Aug. 21, 2020

(65) Prior Publication Data

US 2021/0053763 A1  Feb. 25, 2021

(30) Foreign Application Priority Data

Aug. 22, 2019 (CH) .................................. 01052/19

(51) Int. Cl.
| | |
|---|---|
| *B65G 17/16* | (2006.01) |
| *B65G 17/04* | (2006.01) |
| *B65G 17/18* | (2006.01) |
| *B65G 17/20* | (2006.01) |
| *B65G 17/36* | (2006.01) |
| *B65G 47/38* | (2006.01) |
| *B65G 47/61* | (2006.01) |

(52) U.S. Cl.
CPC ............. *B65G 17/20* (2013.01); *B65G 17/36* (2013.01); *B65G 47/38* (2013.01); *B65G 47/61* (2013.01); *B65G 2201/0238* (2013.01)

(58) Field of Classification Search
CPC ........ B65G 17/04; B65G 17/16; B65G 17/18; B65G 17/20; B65G 17/062
USPC ............................................. 198/678.1, 715
See application file for complete search history.

(56) References Cited

U.S. PATENT DOCUMENTS

| | | | |
|---|---|---|---|
| 2,535,625 A | 12/1950 | Corwin | |
| 2,609,082 A | 9/1952 | Leach | |
| 6,164,440 A * | 12/2000 | Van Bree | B65D 19/44 198/867.11 |
| 8,607,963 B2 | 12/2013 | Wend et al. | |

(Continued)

FOREIGN PATENT DOCUMENTS

| | | |
|---|---|---|
| AT | 520412 A1 | 3/2019 |
| CH | 713 082 A1 | 4/2018 |

(Continued)

OTHER PUBLICATIONS

US 2020/0087073 A1, Schonenberger, Mar. 19, 2020.*

*Primary Examiner* — Douglas A Hess

(74) *Attorney, Agent, or Firm* — Pauley Erickson & Swanson

(57) ABSTRACT

A transport bag (10) for a suspended conveyor system, particularly a rail-guided conveyor system or a transport chain conveyor system, has a conveyor member, particularly a carriage (20) of a rail-guided (41) conveyor system or a conveyor chain link of a transport chain conveyor system, and a transport bag (10) having a receiving region for receiving one or a plurality of units of goods (91). The transport bag is attached, via a suspension means (17), in a suspended manner to a carrying means (23) of the conveyor member. The transport bag has two frame brackets (15, 16) which are pivotally connected to the suspension means. The two frame brackets (15, 16) are substantially 2-fold rotationally symmetrical to one another, but not mirror symmetrical to one another.

14 Claims, 15 Drawing Sheets

(56) References Cited

U.S. PATENT DOCUMENTS

| | | | |
|---|---|---|---|
| 9,187,252 B2* | 11/2015 | Wend | B65G 9/002 |
| 9,630,751 B1* | 4/2017 | Otto | B65D 88/52 |
| 10,065,800 B2 | 9/2018 | Auf Der Maur | |
| 10,207,877 B2* | 2/2019 | Janzen | B65G 19/025 |
| 10,322,887 B2* | 6/2019 | Fenile | B65G 47/78 |
| 10,370,179 B2* | 8/2019 | Schneuing | B65G 47/38 |
| 10,647,523 B2 | 5/2020 | Sigrist | |
| 10,737,889 B2* | 8/2020 | Eisenberg | B65G 65/32 |
| 10,954,079 B2* | 3/2021 | Ramseier | B65G 47/61 |
| 2003/0106774 A1 | 6/2003 | Muller | |
| 2005/0008464 A1 | 1/2005 | Emmerling | |
| 2017/0275826 A1 | 9/2017 | Fenile et al. | |
| 2017/0282317 A1 | 10/2017 | Guhl | |
| 2017/0369248 A1 | 12/2017 | Fenile | |
| 2017/0369250 A1 | 12/2017 | Fenile et al. | |
| 2018/0072511 A1 | 3/2018 | Fenile | |
| 2018/0208407 A1 | 7/2018 | Ruge et al. | |
| 2018/0215547 A1 | 8/2018 | Fenile et al. | |
| 2018/0312341 A1 | 11/2018 | Keller et al. | |
| 2019/0367282 A1 | 12/2019 | Stauber | |
| 2020/0024074 A1 | 1/2020 | Herzog-Lang et al. | |
| 2020/0189846 A1 | 6/2020 | Sutter | |

FOREIGN PATENT DOCUMENTS

| | | |
|---|---|---|
| CH | 713 399 A1 | 7/2018 |
| CN | 106697754 A | 5/2017 |
| DE | 10 354 419 A1 | 6/2005 |
| DE | 10 2004 018 569 A1 | 11/2005 |
| DE | 10 2012 018 925 A1 | 3/2014 |
| DE | 20 2016 008 366 U1 | 11/2017 |
| DE | 20 2017 105 508 U | 12/2017 |
| EP | 1 495 995 A1 | 1/2005 |
| EP | 2 130 968 A1 | 12/2009 |
| EP | 2 196 415 A2 | 6/2010 |
| EP | 2 418 160 A1 | 2/2012 |
| EP | 3 090 967 A2 | 11/2016 |
| EP | 3 575 246 A1 | 12/2019 |
| GB | 2 232 391 A | 12/1990 |
| JP | S52-37381 A | 3/1977 |
| JP | S52-41873 U | 3/1977 |
| JP | S60-176868 U | 11/1985 |
| JP | 2001-253515 A | 9/2001 |
| WO | WO 2018/078098 A1 | 5/2018 |
| WO | WO 2018/142242 A1 | 8/2018 |
| WO | WO 2018/142243 A1 | 8/2018 |
| WO | WO 2018/162123 A1 | 9/2018 |

\* cited by examiner

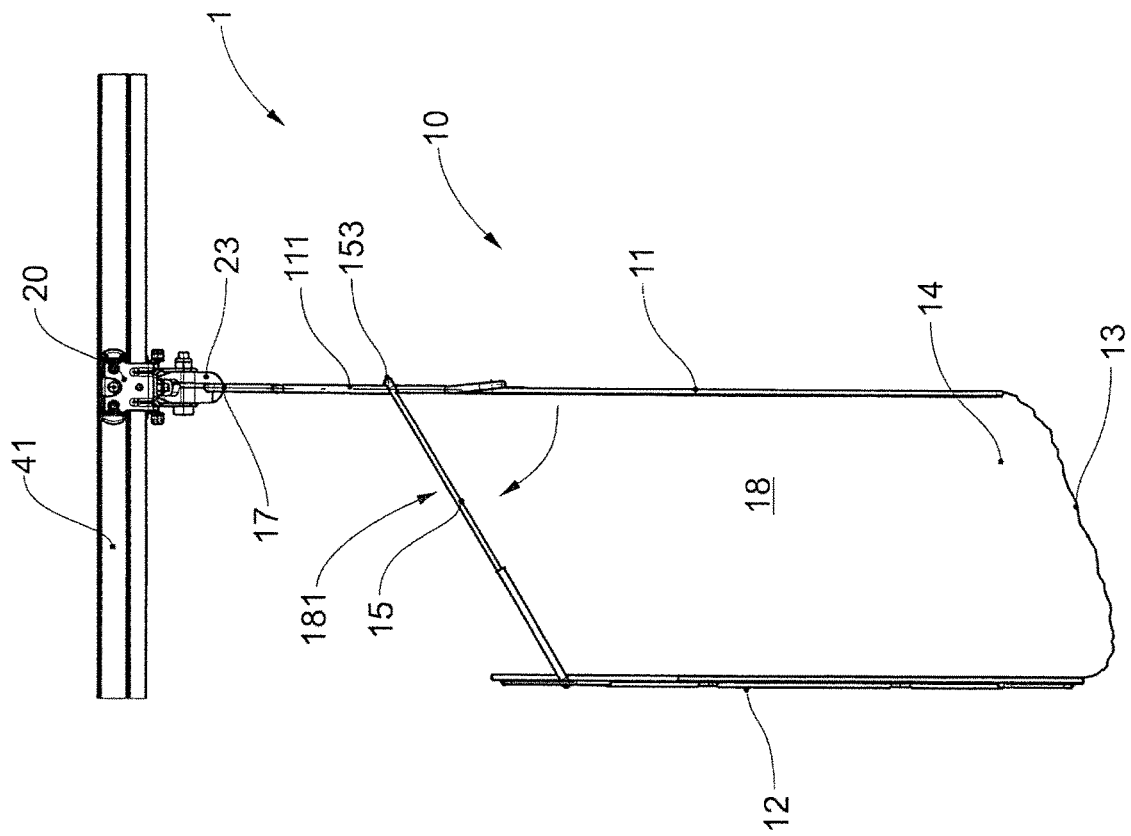
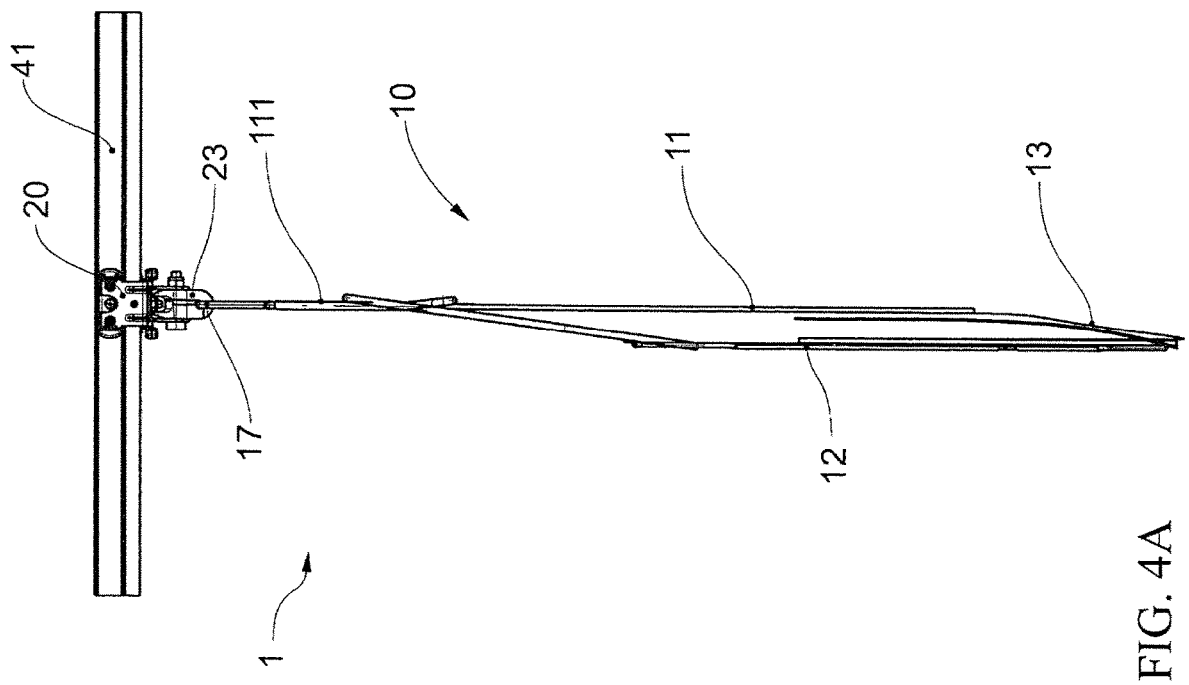
FIG. 4A
FIG. 4B

TRANSPORT BAG FOR SUSPENDED CONVEYOR SYSTEMS

CROSS-REFERENCE TO RELATED APPLICATIONS

Swiss Patent Application 01052/19, filed 22 Aug. 2019, the priority document corresponding to this invention, to which a foreign priority benefit is claimed under Title 35, United States Code, Section 119, and Title 37, United States Code, Section 1.55, and its entire teachings are incorporated, by reference, into this specification.

BACKGROUND OF THE INVENTION

Field of the Invention

The invention relates to transport bags for a suspended conveyor system devices for transferring units of goods into conveyor units and/or out of conveyor units of a suspended conveyor system, and methods for transferring units of goods into conveyor units and/or out of conveyor units of a suspended conveyor system.

Discussion of Related Art

In automated warehouses, extensive production facilities and generally in the conveying and transport of goods, suspended conveyor systems have proven to be an efficient means of transport, intermediate buffering, but also long-term storage of various types of goods. In suspended conveyor systems, the goods are either suspended in a suitable manner directly from individual conveyor members of a conveyor system, or inserted into corresponding transport members such as transport bags, which in turn are mounted in a suspended manner on the conveyor members.

Suspended conveyor systems can be implemented as transport chain installations in which a large number of conveyor members form links of a chain that is moved along a conveyor path. Gravity conveyor systems are also known, in which individual conveyor members move on corresponding running rails. Such gravity-conveyed, rail-guided conveyor systems are known from US 2017/275826 A1, US 2018/215547 A1 and US 2017/282317 A1, for example.

Particularly the constantly increasing volumes in online trading require retailers, suppliers and logistics companies to handle the goods to be processed efficiently, particularly in relation to the production, provision and storage of the articles, as well as the commissioning and transport of the articles to the customer. Suspended conveyor systems having transport members are particularly suitable for efficiently conveying heterogeneous units of goods, such as workpieces in production processes, spare parts, consumer goods like books, clothes, shoes, etc. In the logistics centers of mail order companies, for example, suspended conveyor systems can be used to store a large number of units of goods of different sizes and weights, and to pick groups of articles according to the respective customer orders, i.e. to combine them into groups of goods according to specifications, and to provide them for dispatch.

WO 2018/162123 A1 shows an exemplary method for commissioning units of goods in a suspended conveyor system, in which the individual goods are removed from a collection of goods and commissioned to form groups of goods and provided in the form of these groups of goods for further processing. The groups of goods are combined by inserting the corresponding units of goods into a suspended conveyor system.

A relevant aspect for a suspended conveyor system is the simple, smooth and efficient insertion of units of goods into the empty transport members, for example transport bags, and the simple, smooth and efficient removal of the units of goods from the transport members. A manual insertion of the units of goods into the transport members or removal of the units of goods from the transport members allows a flexible handling of different units of goods but is slow and cost-intensive. Partially or fully automated systems were developed accordingly.

EP 2130968 A1 shows a loading station for transport bags transported on a suspended conveyor installation. The transport bags have a stiffened wall in the conveying direction with a suspension hook at an upper end, which is suspended from a carriage. The wall is transversely aligned to the conveying direction. A fabric panel is attached to a pivoting frame bracket attached to the top of the wall and to the bottom of the wall to form a laterally open pouch. The transport bags are continuously conveyed horizontally along the conveying path. The vertically suspended frame bracket in the empty state of the transport bag is pressed upwards into a horizontal position by a slotted guide, thereby opening the lateral bag openings. The units of goods can now be inserted into the pouch of the transport bag through the lateral openings. Filling from above is not possible as the upper opening of the transport bag is not accessible due to the running rail of the conveyor system.

US 2018/072511 A1 shows a device for opening a transport bag that can be transported in a suspended conveyor installation. The carriage having the transport bag suspended thereon is stopped in the forward movement thereof at a predetermined point on the running rail to open the transport bag. The transport bag is opened for loading and/or unloading by an actuator pivoting the frame bracket upwards in such a manner that the lateral bag openings are opened, and the pouch of the transport bag becomes accessible.

US 2018/0208407 A1 shows a plurality of variants of loading stations for transport bags conveyed in a suspended manner, in which units of goods are inserted into transfer compartments of a transfer device. The transfer device is configured as a wheel or as a concentricity. The transfer compartments of the transfer device move in a transfer region synchronously with a sequence of open transport bags. By opening a flap, a transfer compartment is released respectively in such a manner that the unit of goods therein falls into the transport bag located below. Such a device allows a stream of transport bags to be filled continuously.

EP 2418160 A1 shows a further loading station for transport bags transported on a suspended conveyor installation. The transport bags have a frame bracket suspended on a carriage, to which two ends of a flexible fabric panel are attached and form a pouch. A pressure plate is arranged underneath the suspension hook of the pouch. In the loading station there, is a skid which, when a transport bag moves through the loading station, presses the pressure plate and therefore also the transport bag from an orientation transverse to the conveying direction into an orientation parallel to the conveying direction and holds it in this orientation. The form of the suspension hook is selected in such a manner that the suspension hook is pressed upwards in the carrying hook of the conveyor member. At the same time, the frame bracket, which is firmly connected to the pressure plate, is pressed outwards from the vertical rest position transverse to the conveying direction and assumes a location in which the frame bracket has an inclination of approx. 45°, in such a manner that an upper bag opening defined by the frame bracket becomes accessible. In this filling position the transport bag can now be filled from the lateral side through the upper opening. After leaving the region of the skid, the suspension hook on the carrying hook slides back to a minimum of potential energy, and the bag pivots back into the associated orientation transverse to the conveying direction. Due to the manner in which the transport bag is firmly fixed in the filling position, the possible carrying capacity of a transport bag is limited, as otherwise the transport bag can jam, for example due to excessive friction of the pressure plate with the skid.

WO 2018/142242 A1 shows a device for automatically rotating empty transport bags conveyed in a suspended manner or other transport units in a conveyor system in such a manner that they can be filled efficiently. The carriage has a carrying hook which permits two or a plurality of stable bearing positions of a carrying hook of the transport bag, wherein in a first stable bearing position the transport bag is aligned transversely to the conveying direction, and in a second stable bearing position parallel to the conveying direction.

WO 2018/078098 A1 describes a loading station for transport bags transported on a suspended conveyor installation. The transport bag arranged transversely to the conveying direction has a stiffened front wall in the conveying direction. The transport bag is fed horizontally and stopped for loading. An actuator lifts the front wall, thereby opening the transport bag. A unit of goods is placed in the transport bag via a chute. After filling, the now loaded transport bag is conveyed away upwards.

US 2017/0369250 A1 shows a further loading station for transport bags transported on a suspended conveyor installation. A circulating conveyor chain of a concentricity is equipped along the circumference with rail segments of a running rail. Transport members having transport bags arranged transversely to the conveying direction are fed onto a running rail. The transport members are then placed individually on a rail segment of the concentricity that is directly connected to the running rail feeding. The concentricity arranged perpendicular to the conveying direction moves the rail segment one position further to a loading position. One front wall of the transport bag is lowered, a unit of goods is inserted over the upper edge of the lowered front wall into the now open transport bag, and the front wall is raised again. The concentricity moves the closed transport bag to the next position, where a running rail leading away is connected to the rail segment in the conveying direction, onto which the transport member is transferred.

There is a general need for improvement in this field of technology.

SUMMARY OF THE INVENTION

An object of the invention is to provide a transport bag for a suspended conveyor system, which is particularly advantageous for use in a transfer method or transfer device according to the invention Another object of the invention is to provide a device for transferring units of goods into and/or out of conveyor units of a suspended conveyor system, which does not have the abovementioned and other disadvantages. Particularly such a transfer device should have a small volume and a small base surface requirement. It should be energy efficient, have a low probability of failure, be less prone to errors and require less maintenance. Production, operation and maintenance should be cost-effective.

A further object of the invention is to provide a method by which units of goods can be transferred into and/or out of conveyor units of a suspended conveyor system.

These and other objects are solved by the elements of independent claims. Further advantageous embodiments can also be found in the dependent claims and the description.

The solution according to the invention can be further improved by various configurations which are advantageous in themselves and, unless implemented differently, can be combined with each other as desired. These embodiments and the advantages associated with them are discussed below.

In this description, the term "unit of goods" is used synonymously and may comprise particularly single piece of goods, but also packaged goods such as packages, and in general individually handleable objects.

A first aspect of the invention relates to advantageous devices for transferring units of goods into and/or out of conveyor units of a suspended conveyor system.

A device according to the invention for transferring units of goods into conveyor units and/or out of conveyor units of a suspended conveyor system has a suspended conveyor system, on which conveyor units can be conveyed in a suspended manner along a continuous conveyor path. The suspended conveyor system can be particularly a rail-guided conveyor system or a transport chain conveyor system. In an entry region of the suspended conveyor system, supplied conveyor units can be provided for further processing, particularly loading and/or unloading. Downstream of the aforementioned entry region, a transfer device is provided in a transfer region of the suspended conveyor system, with which units of goods can be transferred into and/or out of a conveyor unit located in the transfer region. Downstream of the aforementioned transfer region, processed conveyor units can be provided in an exit region of the suspended conveyor system for further use, particularly for further transport. In the transfer region, the conveying path runs advantageously substantially horizontally.

The absolute alignment in space of a conveyor unit in the entry region and in the transfer region is substantially the same, and the relative alignment of the aforementioned conveyor unit in relation to the conveying direction in the entry region and in the transfer region is substantially different. Alternatively or additionally, the absolute alignment in space of a conveyor unit in the transfer region and in the exit region is substantially the same, and the relative alignment of the aforementioned conveyor unit in relation to the conveying direction in the transfer region and in the exit region is substantially different.

In an advantageous embodiment of such a transfer device, the conveying path of the suspended conveyor system in the entry region and the conveying path of the suspended conveyor system in the transfer region are not aligned and are at a first angle to one another.

Alternatively or additionally, the conveying path of the suspended conveyor system in the transfer region and the conveying path of the suspended conveyor system in the exit region are not aligned and are at a second angle to one another.

In an advantageous embodiment of such a transfer device, a first transfer region is arranged between the entry region and the transition region of the suspended conveyor system, in which an apparatus is provided with which the alignment of a conveyor unit can be changed in relation to the conveying direction.

Alternatively or additionally, in a transfer device a second transfer region is advantageously arranged between the transition region and the exit region, in which there is an apparatus with which the alignment of a conveyor unit can be changed in relation to the conveying direction.

In a transfer device, a first transfer region is advantageously arranged between the entry region and the transition region of the suspended conveyor system; and/or a second transition region is arranged between the transfer region and the exit region; and a guide member is provided which limits a rotary movement of a conveyor unit in the first transition region or in the second transition region.

Particularly advantageous in the aforementioned embodiment of a transfer device is a surface of a guide member interacting with a conveyor unit in the first transition region or in the second transition region, respectively, substantially a section of an enveloping plane, wherein the enveloping plane is defined by the hypothetical path of an outer edge of a conveyor unit which is displaced downstream along the conveying path in the corresponding transition region when the aforementioned conveyor unit substantially maintains the absolute alignment thereof in space during this displacement.

Alternatively or additionally, a stop member is used as a guide member in such a transfer device, whose surface interacting with the conveyor unit is aligned substantially parallel to the conveying path in the transfer region and to the vertical direction.

Advantageously, the first angle is $\geq 45°$, more advantageously $\geq 60°$, and particularly advantageously $\geq 80°$ for a transfer device.

Advantageously, the first angle is $\leq 160°$, more advantageously $\leq 120°$, and particularly advantageously $\leq 100°$ for a transfer device.

Advantageously, the second angle is $\geq 45°$, more advantageously $\geq 60°$, and particularly advantageously $\geq 80°$ for a transfer device.

Advantageously, the second angle is $\leq 160°$, more advantageously $\leq 120°$, and particularly advantageously $\leq 100°$ for a transfer device.

Even more advantageous in a transfer device, the first angle and/or the second angle is substantially $90°$.

The suspended conveyor system of a transfer device according to the invention can be a rail-guided conveyor system on which a carriage of a conveyor unit can be moved by rolling and/or sliding.

The suspended conveyor system of a transfer device according to the invention has advantageously at least one conveyor unit.

Particularly advantageous, the at least one conveyor unit of the suspended conveyor system of the transfer device according to the invention has a conveyor member having a carrying hook attached to the conveyor member and a transport member having a suspension hook attached to the transport member. The suspension hook is suspended in the carrying hook and can assume at least two stable bearing positions in the carrying hook. The suspension hook in the first stable bearing position thereof is rotated about an axis through a certain angle, in relation to the suspension hook in the second stable bearing position.

The aforementioned rotational axis is advantageously the vertical axis.

The conveyor member of at least one conveyor unit of the suspended conveyor system of the transfer device according to the invention is advantageously a carriage of a rail-guided conveyor system or a conveyor chain link of a transport chain conveyor system.

The transport member of the at least one conveyor unit of the suspended conveyor system of the transfer device according to the invention is advantageously a transport bag, a clothes hanger, particularly a suspended clothes hanger or a clamping hanger, or a device for holding two or a plurality of containers or other objects and items.

The carrying hook of the conveyor member of the at least one conveyor unit is configured in a particularly advantageous embodiment of the transfer device according to the invention in such a manner that in a certain spatial orientation of the carrying hook, the suspension hook of the transport member of the at least one conveyor unit can assume a first stable bearing position in which the suspension hook is aligned in a first plane; and in the same spatial orientation of the carrying hook, the suspension hook can assume a second stable bearing position in which the suspension hook is aligned in a second plane; wherein the first bearing position and the second bearing position correspond to a local minima of the potential energy of the suspended transport member; and wherein the suspension hook is transferable between the first stable bearing position and the second stable bearing position by rotating the suspension hook by a certain rotational angle.

The carrying hook of the conveyor member of the at least one conveyor unit is configured in another particularly advantageous embodiment of the transfer device according to the invention in such a manner that in a certain first spatial orientation of the carrying hook the suspension hook of the transport member of the at least one conveyor unit can assume a first stable bearing position in which the suspension hook is aligned in a first plane. In a second spatial orientation of the carrying hook different from the certain first spatial orientation, the suspension hook can assume a second stable bearing position in which the suspension hook is aligned in a second plane. In the certain first spatial orientation of the carrying hook, the first bearing position corresponds to a minimum of the potential energy of the suspended transport member. In the certain second spatial orientation of the carrying hook, the second bearing position corresponds to a minimum of the potential energy of the suspended transport member. The suspension hook can be transferred back and forth between the first bearing position and the second bearing position by turning the carrying hook by a certain rotational angle.

It is advantageous in the aforementioned embodiment of a transfer device according to the invention that the suspension hook can be transferred back and forth between the first bearing position and the second bearing position by rotating the conveyor member about the axis of the conveying direction.

A second aspect of the invention relates to advantageous methods for transferring units of goods into and/or out of conveyor units of a suspended conveyor system.

A method according to the invention for transferring units of goods into and/or out of conveyor units of a suspended conveyor system comprises the following steps:

providing a suspended conveyor system having a continuous conveying path for the suspended transport of conveyor units;

providing a conveyor unit in an entry region of the aforementioned suspended conveyor system, wherein the conveyor unit in the aforementioned entry region has a first orientation relative to the conveyor path;

transferring the provided conveyor unit along the conveyor path from the entry region to a transfer region of the suspended conveyor system, wherein the conveyor unit in the aforementioned transfer region has a second orientation relative to the conveyor path;

transferring at least one unit of goods into and/or out of this conveyor unit;

transferring the conveyor unit along the conveyor path from the transfer region to an exit region of the suspended conveyor system, wherein the conveyor unit in the aforementioned exit region has a third orientation relative to the conveyor path.

In the transfer region, the conveyor path of the conveyor unit runs substantially horizontally.

The absolute alignment in space of a conveyor unit in the entry region and in the transfer region is substantially the same, and the first orientation and the second orientation of the conveyor unit relative to the conveyor path in the entry region and in the transfer region are substantially different. Alternatively or additionally, the absolute alignment in space of a conveyor unit in the transfer region and in the exit region is substantially the same, and the second orientation and the third orientation of the conveyor unit relative to the conveyor path in the transfer region and in the exit region are substantially different.

Advantageously, in such a method the first orientation of the conveyor unit relative to the conveyor path and the second orientation of the conveyor unit relative to the conveyor path are different, advantageously by an angle of 30° to 60° and particularly advantageously by an angle of substantially 90°, while the absolute alignment in space of the conveyor unit remains substantially unchanged during the transfer of the conveyor unit from the entry region to the transfer region.

Alternatively or additionally, the second orientation of the conveyor unit relative to the conveyor path and the third orientation of the conveyor unit relative to the conveyor path are different, advantageously by an angle of 30° to 60° and particularly advantageously by an angle of substantially 90°, while the absolute alignment in space of the conveyor unit remains substantially unchanged during the transfer of the conveyor unit from the transfer region to the exit region.

Advantageously, the provided suspended conveyor system is the suspended conveyor system of a transfer device according to the invention as described above.

In an advantageous variant of such a method, a change in the orientation of the conveyor unit relative to the conveyor path is at least partially achieved by at least one actuator.

Alternatively or additionally, in an advantageous variant of such a method, a change in the orientation of the conveyor unit relative to the conveyor path is at least partially achieved by a rotation of the conveyor member about the axis of the conveying direction.

Alternatively or additionally, in an advantageous variant of such a method, a change in the orientation of the conveyor unit relative to the conveyor path is at least partially achieved by guide members which interact with the conveyor unit.

Particularly advantageous in the aforementioned embodiment of a method is that the surface of a guide member interacting with the conveyor unit is substantially a section of an enveloping plane, wherein the enveloping plane is defined by the hypothetical path of an outer edge of a conveyor unit which is displaced downstream along the conveyor path in the corresponding transition region if the aforementioned conveyor unit substantially maintains the absolute alignment thereof in space during this displacement.

A stop member, whose surface interacting with the conveyor unit is substantially parallel to the conveyor path in the transfer region, serves advantageously as a guide member.

A third aspect of the invention relates to transport bags for suspended conveyor systems.

A transport bag according to the invention for a suspended conveyor system, particularly a rail-guided conveyor system or a transport chain conveyor system, comprises a conveyor member, particularly a carriage of a rail-guided conveyor system or a conveyor chain link of a transport chain conveyor system, and a transport bag for receiving one or a plurality of units of goods. The transport bag is attached, via a suspension means, to a carrying means of the conveyor member in such a manner that it can be rotated about a rotational axis. The transport bag has two frame brackets, which are pivotably connected to the suspension means. The two frame brackets are substantially 2-fold rotationally symmetrical to one another, but not mirror symmetrical to one another.

The transport bag advantageously has at least one wall which defines the receiving region of the transport bag and which is pivotally connected at two edges of the wall to a region of one of the two frame brackets facing away from the suspension means.

The wall can be realized as a carrying loop in the form of a panel made of a flexible material, for example a textile fabric or a foil.

Alternatively, a first rigid wall and a second rigid wall are connected by a flexible base of the bag.

Optionally lateral walls can be provided.

The transport bag is advantageously attached to a carrying means of the conveyor member via a suspension means in such a manner that it can be rotated about a rotational axis.

Advantageous for such a transport bag are the two frame brackets about a rotational axis substantially 2-fold rotationally symmetrical to one another, but not mirror-symmetrical to one another.

In an advantageous embodiment of such a transport bag, a first of the two frame brackets has a first engagement region adapted to be engaged by an actuator for pivoting the first frame bracket; and a second of the two frame brackets has a second engagement region adapted to be engaged by an actuator for pivoting the second frame bracket. The first engagement region of the first frame bracket is 2-fold rotationally symmetrical to the second engagement region of the second frame bracket about the rotational axis.

In a particularly advantageous embodiment of such a transport bag, the transport bag has at least one wall which defines the receiving region of the transport bag, and which is pivotally connected at two edges of the wall to a respective region of one of the two frame brackets facing away from the suspension means. The first engagement region, when looking perpendicular toward the at least one wall, protrudes on a first side over an outer edge of the at least one wall. The second engagement region, when looking perpendicular toward the at least one wall, protrudes on a second side, opposite to the first side, over the outer edge of the at least one wall.

Advantageously, the first engagement region protrudes laterally on the first side over the outer edge of the at least one wall; and the second engagement region protrudes laterally on the second side over the outer edge of the at least one wall.

In another particularly advantageous embodiment of such a transport bag, the transport bag has at least one wall which defines the receiving region of the transport bag, and which is pivotally connected at two edges of the wall to a respective region of one of the two frame brackets facing away from the suspension means. The first engagement region, when looking perpendicular toward the at least one wall, protrudes on a first side in a first region over an outer edge of the at least one wall, and protrudes on a second side, opposite to the first side, in a second region over the outer edge of the at least one wall. The second engagement region protrudes on the first side in a second region over the outer edge of the at least one wall; and protrudes on the second side in a first region over the outer edge of the at least one wall.

Advantageously, in such a transport bag the first engagement region is realized as one or more sections of the first frame bracket; and the second engagement region is realized as one or more sections of the second frame bracket.

In an alternative advantageous embodiment, the first engagement region and the second engagement region are realized as protruding rigid plates or pins attached to the frame brackets.

Such a transport bag is advantageously connected to the conveyor member via a rotating joint in such a manner that it can be rotated about the vertical rotational axis.

Alternatively or additionally, such a transport bag has a suspension hook; the conveyor member has a carrying hook; and the suspension hook is suspended in the carrying hook; wherein the suspension hook can assume at least two stable bearing positions in the carrying hook, and wherein the suspension hook in a first stable bearing position is rotated through a certain angle relative to the suspension hook in a second stable bearing position.

Examples of such carrying hook/suspension hook systems are disclosed in WO 2018/142242 A1.

It is advantageous in the aforementioned embodiment of a transport bag that the carrying hook of the conveyor member is configured in such a manner that in a certain spatial orientation of the carrying hook, the suspension hook of the transport bag can assume a first stable bearing position in which the suspension hook is aligned in a first plane; and in the same spatial orientation of the carrying hook, the suspension hook can assume a second stable bearing position in which the suspension hook is aligned in a second plane; wherein the first bearing position and the second bearing position correspond to a local minima of the potential energy of the suspended transport bag; and wherein the suspension hook is transferable between the first stable bearing position and the second stable bearing position by rotating the suspension hook by a certain rotational angle.

Examples of such carrying hook/suspension hook systems are also known from WO 2018/142242 A1.

BRIEF DESCRIPTION OF SEVERAL VIEWS OF THE DRAWINGS

For a better understanding of the present invention, reference is made below to the drawings. These only show examples of the subject matter of the invention and are not suitable for limiting the invention to the features disclosed herein. The same or similar reference signs are used in the following figures and the corresponding description for identical or similar elements.

FIG. 4A is a schematic cross-sectional view of another possible embodiment of an advantageous transport bag conveyor unit for a rail-guided suspended conveyor system, as an empty bag in the closed state.

FIG. 4B is a schematic cross-sectional view of another possible embodiment of an advantageous transport bag conveyor unit for a rail-guided suspended conveyor system, as an empty bag in the open state.

DETAILED DESCRIPTION OF THE INVENTION

Figures 1A, 1B:
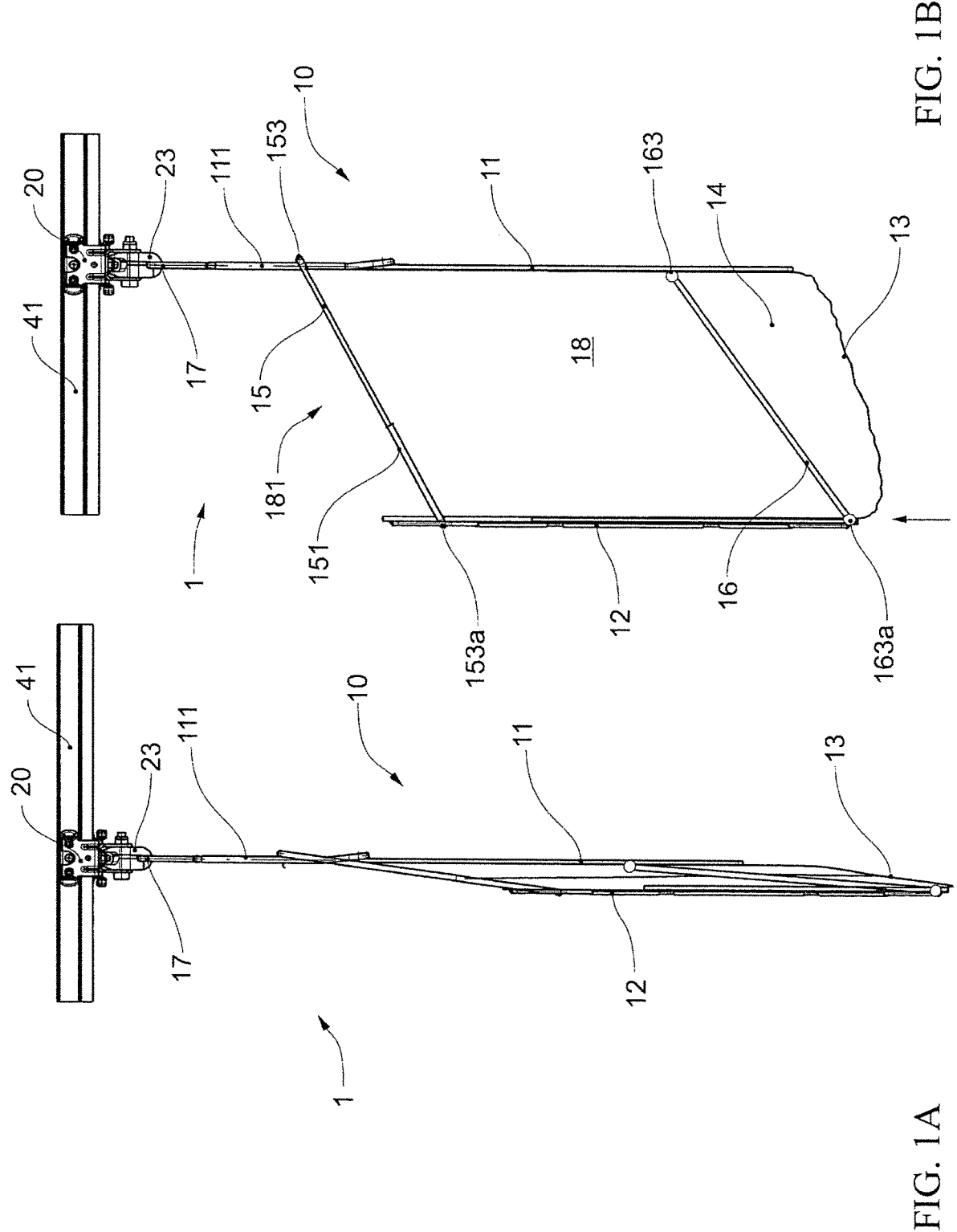
FIG. 1A is a schematic cross-sectional view of a possible embodiment of an advantageous transport bag conveyor unit for a rail-guided suspended conveyor system as an empty bag in the closed state.
FIG. 1B is a schematic cross-sectional view of a possible embodiment of an advantageous transport bag conveyor unit for a rail-guided suspended conveyor system as an empty bag in the open state.

An advantageous conveyor unit 1, as it can be used in a transfer device according to the invention, is shown schematically in FIGS. 1 and 2. A carriage 20 is arranged on a running rail 41 of a rail-guided suspended conveyor system in such a manner that it can be moved by rolling A transport bag 10 is suspended from a carrying hook 23 of the carriage 20 via a suspension hook 17.

The carriage 20 has a carrying structure 22 on which three pairs of running rollers 21, 21', 21" are rotatably mounted. The two pairs of running rollers 21, 21' roll in normal operation on corresponding running surfaces of the running rail 41 (not shown in FIG. 2 for clarity) and carry the weight of the conveyor unit 1. In normal operation, the pair of running rollers 21" is arranged as a guide roller in a guide channel of the running rail 41 and absorbs radial forces when the running rail is curved in such a manner that a tilting of the carriage 20 is avoided. On the carrying structure 22 of the carriage 20 there are lateral engagement bolts 24 which can be engaged with actuator devices of the conveyor system, for example worm drives, chain drives or separating devices, in order to move, stop or release the carriage along the running rail 41.

The transport bag 10 comprises a first bag wall 11, a second bag wall 12 and a bag bottom 13. The two bag walls and the bottom of the bag are each closed on the lateral side with a bag lateral wall 14, and together define as the inner space of the transport bag a pouch 18 having a bag opening open at the top. In the embodiment shown, the first bag wall 11 and the second bag wall 12 are substantially rigid, for example in the form of a plate made of polymer material. It is also possible to configure one or both bag walls as a rigid frame, for example made of wire covered with an elastic and/or flexible surface material, for example a textile fabric or net. In the embodiment shown, the bottom of the bag 13 is configured as an elastic and/or flexible foil or as a textile surface product, which connects the lower ends of the two bag walls 11, 12. The two pocket lateral walls 14 are also configured as elastic and/or flexible films or textile surface products. The first bag wall 11 has an upper region 111 on which the suspension hook 17 is arranged. In the embodiment shown, the suspension hook 17 is configured as a wire loop of a wire frame of the first bag wall 11.

The first bag wall 11 and the second bag wall 12 are connected by two pivoting 153, 153a, 163, 163a frame brackets 15, 16 attached to the aforementioned bag walls, in such a manner that the second bag wall 12 can be pivoted and/or moved in relation to the first bag wall 11. In the embodiment shown, the bag lateral walls 14 are connected at an upper end with the first frame bracket 15.

In a closed state of the empty transport bag 10, as shown in FIG. 1A, the second bag wall 12 lies close to the first bag wall 11 due to the weight of the second bag wall 12, the bag bottom 13 and the frame brackets 15, 16 pivoted downward to the maximum.

When the empty transport bag 10 is open, as shown in FIG. 1B, the second bag wall 12 is pivoted up against and away from the first bag wall 11 in such a manner that the bag interior 18 is accessible through the upper bag opening 181. The second bag wall can be raised, for example, by pivoting the first frame bracket 15 and/or the second frame bracket 16, or by lifting a lower end of the rigid second bag wall 12 (indicated by an arrow).

The conveying direction of the conveyor unit shown can be to the left or to the right. In the conveying direction to the left, the second bag wall 12 in the running direction is the leading wall, and the first bag wall 11 is the following wall. In the conveying direction to the right, the first bag wall 11 in the running direction is the leading wall, and the second bag wall 12 is the following wall.

Instead of the discussed transport bag, other functionally analogous transport bags can also be used, as discussed below, or transport bags such as those shown in FIGS. 1 and 1B of WO 2018/142242 A1.

Figure 2A:
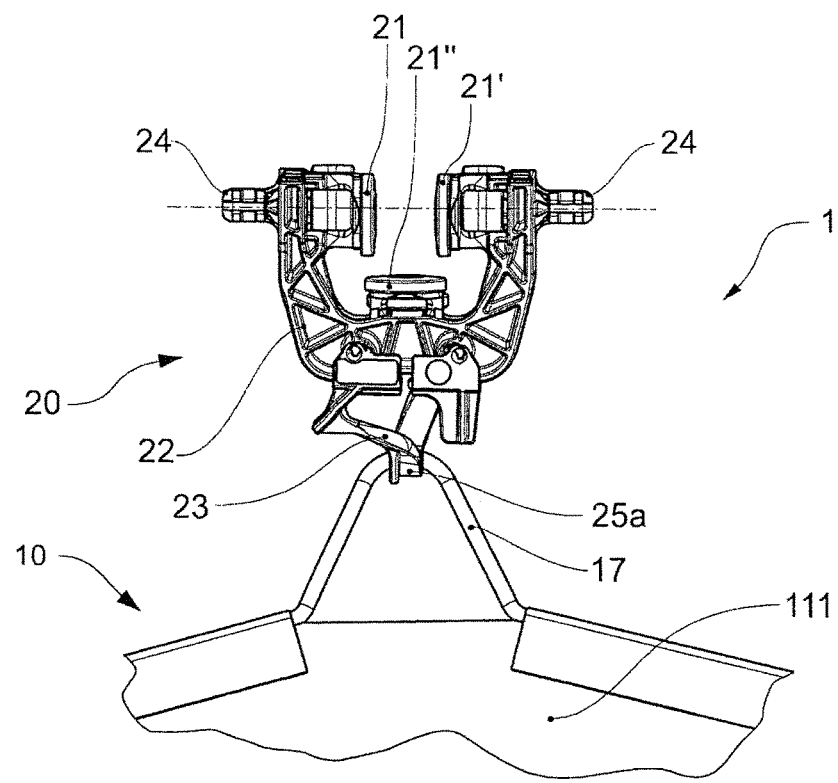
FIG. 2A is a schematic representation of the carriage and an upper part of the transport bag of the conveyor unit from FIG. 1, viewed in the opposite direction to the conveying direction, and not showing the running rail, with the carriage in a first rotational alignment about the axis of the conveying direction and the suspension hook of the transport bag in a first stable bearing position of the carrying hook of the carriage.

The carrying hook 23 of the carriage 20 is configured in such a manner that in the normal location of the running rail, in a horizontal alignment [shown in FIG. 2A], in which the rotational axes of the pairs of running rollers 21, 21' are aligned horizontally, it has a single, first stable bearing position 25a, in which the suspension hook 17 of the transport bag 10 rests firmly. In this first bearing position 25a, corresponding to FIG. 1, the transport bag is aligned transverse to the conveying direction or longitudinal axis of the running rail (not shown).

Figure 2B:
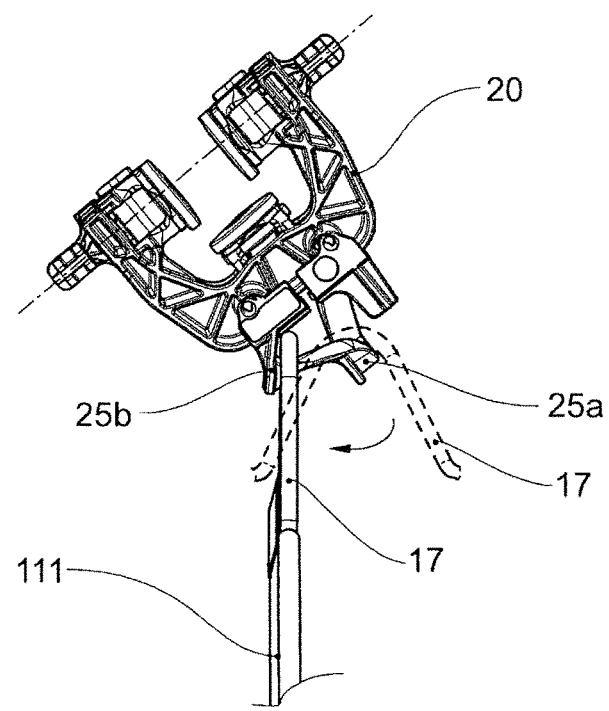
FIG. 2B is a schematic representation of the carriage and an upper part of the transport bag of the conveyor unit from FIG. 1, viewed in the opposite direction to the conveying direction, and not showing the running rail, with the carriage in a second rotational alignment about the axis of the conveying direction and the suspension hook of the transport bag in a second stable bearing position of the carrying hook of the carriage.

If the carriage 20 is rotated by 45° in the conveying direction or in the direction of the longitudinal axis of the running rail 41 [shown in FIG. 2B], another place of the suspension hook 23 becomes a second stable bearing position 25b, in which the suspension hook 17 of the transport bag 10 can rest firmly. In this second bearing position 25a, the transport bag is aligned parallel to the conveying direction or to the longitudinal axis of the running rail 41.

The rotation of the carriage about the axis of the conveying direction results from a corresponding rotation of the running rail by 45°, for example by a temporary rotation of a partial segment of the running rail about the rail axis on which the carriage is located. Likewise, the rotation of the carriages during conveying along the running rail can be achieved by continuously twisting the running rail over a certain distance.

Figure 5B:
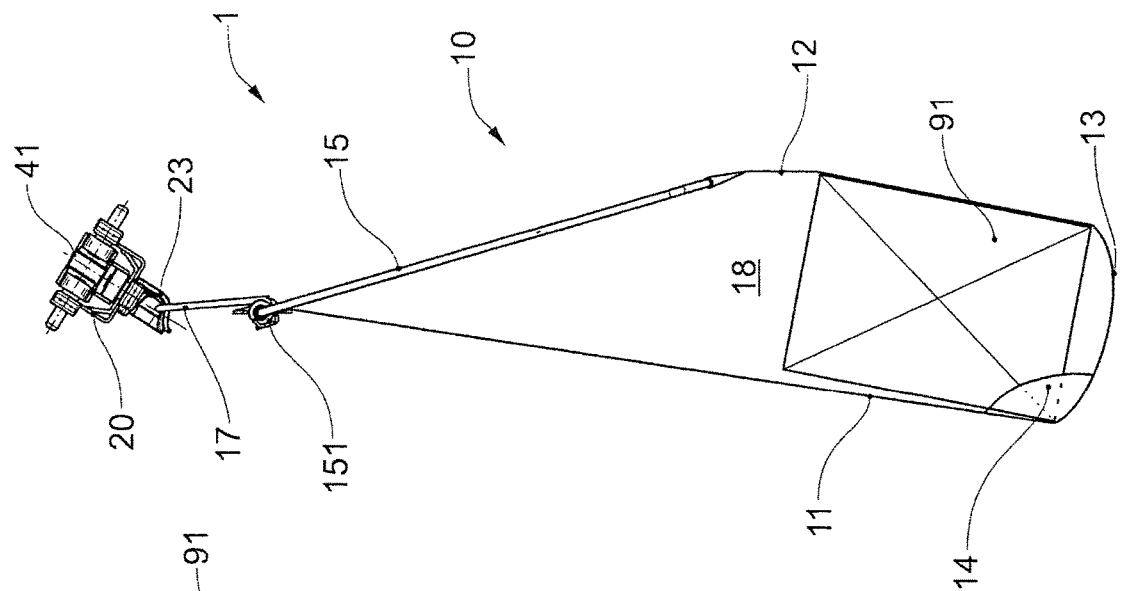
FIG. 5B is a schematic cross section of another possible embodiment of an advantageous transport bag conveyor unit for a rail-guided suspended conveyor system, as a bag loaded with a unit of goods in the closed state.
Figure 5A:
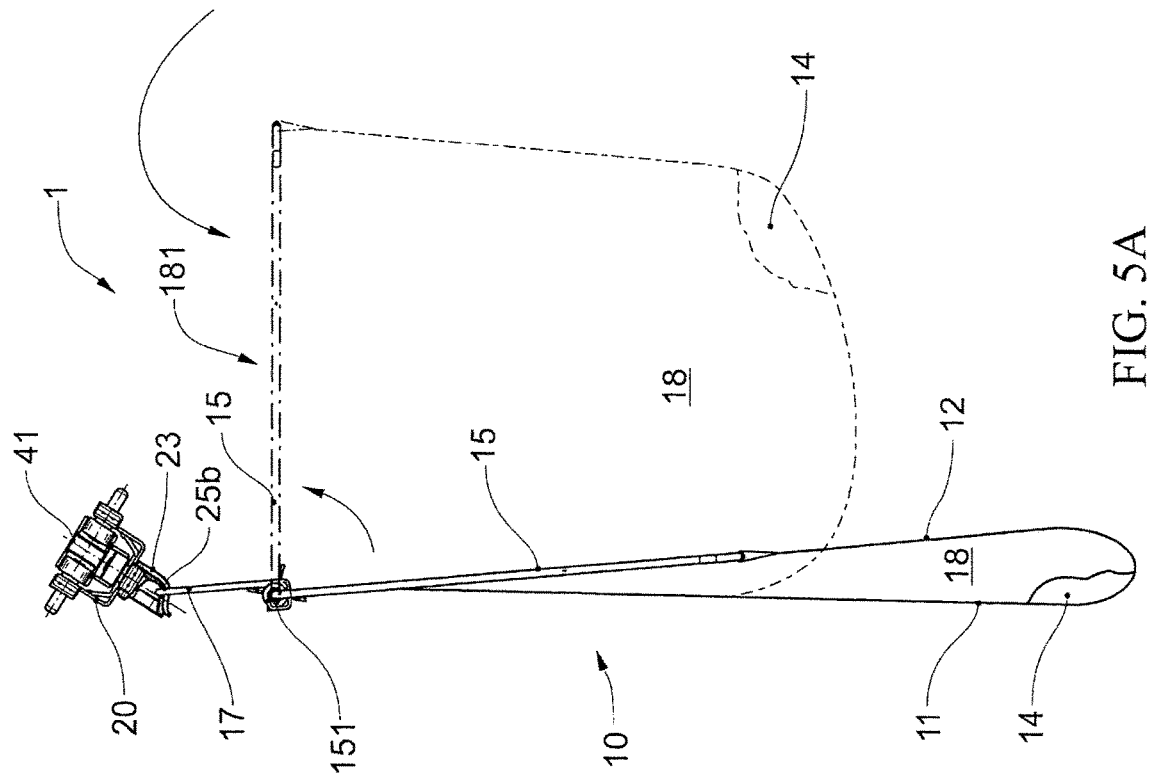
FIG. 5A is a schematic cross section of another possible embodiment of an advantageous transport bag conveyor unit for a rail-guided suspended conveyor system, as an empty bag in the closed state (extended lines) and in the open state (dotted lines).

In the embodiment of the carriage shown, which corresponds to FIG. 5A in WO 2018/142242 A1, the suspension hook 23 is configured in such a manner that, when the carriage is rotated by 45°, both the first stable bearing position 25a (dotted suspension hook 17) and the second stable bearing position 25b are available, which are separated by a raised intermediate portion. The transport bag or suspension hook 17 can be transferred between the two stable bearing positions 25a, 25b by an actuator device which turns the transport bag and therefore also the suspension hook about the vertical axis.

If the rotational angle of the carriage shown is more than 45°, for example 60°, only the second stable bearing position 25b is available, since the first position 25a no longer represents a local minimum of the potential energy. If the carriage is rotated by such an angle from the horizontal alignment (rotation 0°), the suspension hook 17 automatically slides by gravity into the new, single stable bearing position 25b. Instead of selecting a higher rotational angle of the carriage, the support hook can alternatively be configured in such a manner that even with lower rotational angles of the carriage, only a stable bearing position exists.

Figure 3:
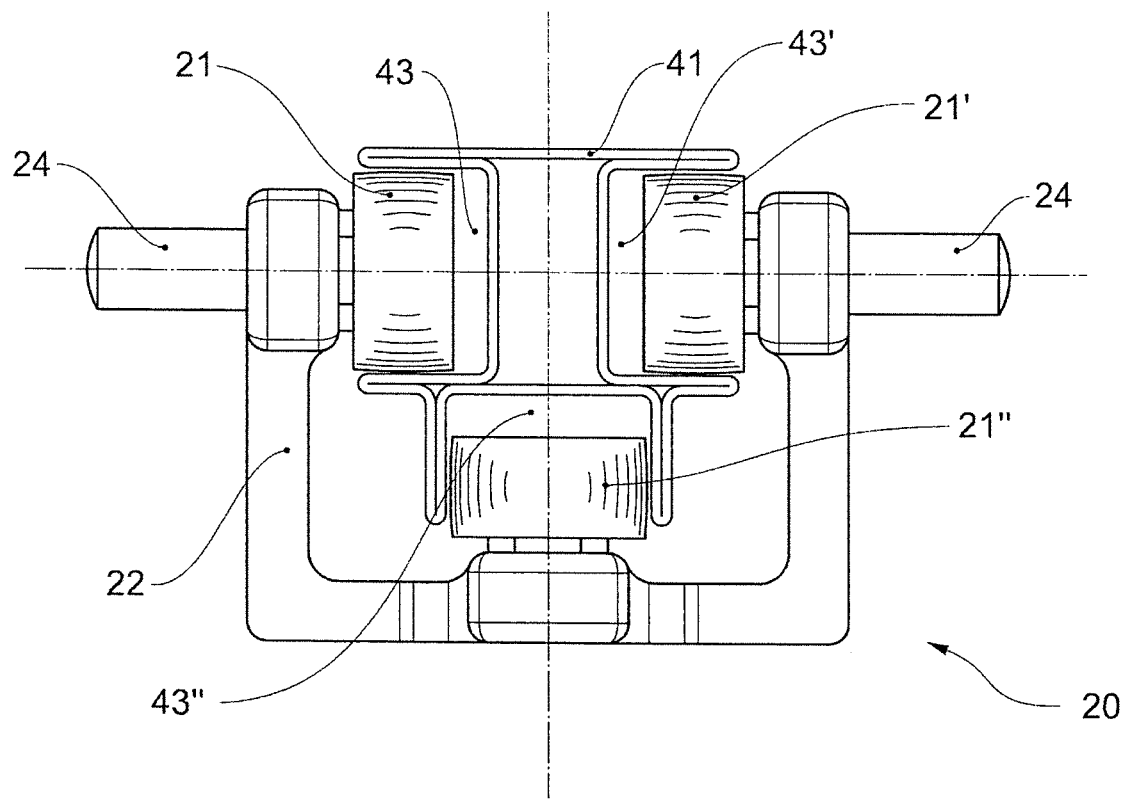
FIG. 3 is a schematic representation of another possible carriage of a conveyor unit, arranged in the running rail of a suspended conveyor system.

Another exemplary variant of a carriage 20 is shown in FIG. 3. The carriage 20 has a stable carrying structure 22 having three pairs of running rollers 21, 21', 21" and two engagement bolts 24. The carriage 20 is adapted to a corresponding running rail 41 of a suspended conveyor system. The running rail 41 comprises three channels, wherein a channel 43" directed downwards in the horizontally aligned running rail 41 shown serves as guide channel 43", in which the roller 21" runs as a guide roller. The two pairs of running rollers 21, 21' are arranged in the other two channels 43, 43' of the running rail and run in the horizontal arrangement shown on the underlying side surfaces of these channels. For coupling a transport member such as a transport bag to the carriage, a suitable apparatus (not shown) is arranged below the guide roller 21" on the carrying structure 22, for example a carrying hook as in the embodiment discussed above.

The running rail can be attached to a superordinate structure with suitable attachment members, and is made of a folded tube profile in the embodiment shown. Production as a continuous cast profile is also cost-effective. More complicated shaped running rails can also be produced by milling, casting, sintering or 3D printing.

Another advantageous conveyor unit 1 is shown in FIG. 4. The carriage 20 of the conveyor unit corresponds to the one in FIG. 1. The transport bag 10, however, only has a first frame bracket 15 in relation to the embodiment in FIG. 1. As a result, the second bag wall 12 has two degrees of freedom in relation to the first bag wall 11, and can also rotate freely in relation to the first bag wall 11 within the limits of what is geometrically possible.

To transfer the empty transport bag from the closed state [FIG. 4A] to the open state [FIG. 4B], the frame bracket 15 can be pivoted from a substantially vertical orientation to an inclined or horizontal orientation, for example by a suitable actuator device. This opens the bag opening 181 and the bag interior 18 is accessible.

A further advantageous conveyor unit 1 is shown in FIG. 5a, 5b, seen along the axis of the running rail 41. The carriage 20 and the running rail 41 correspond to the embodiment shown in FIG. 3. The carrying hook 23 corresponds to the carrying hook in FIG. 2. The running rail 41 is rotated at a certain angle to the horizontal orientation.

The transport bag 10 comprises a suspension hook 17, which rests in the second, stable bearing position 25b of the carrying hook 23, in such a manner that the transport bag 10 is aligned parallel to the conveying direction or to the axis of the running rail 41.

At a lower end of the suspension hook 17, a closed rectangular frame bracket 15 is pivotably connected to the suspension hook 17 via a joint member 151. A first longitudinal edge of a rectangular fabric panel made of a film or a textile surface product is pivotably attached to the frame bracket on the side of the joint member. The opposite second longitudinal edge of the fabric panel is pivotally attached to the opposite side of the frame bracket 15. The fabric panel integrally forms a carrying loop having a first bag wall 11, a second bag wall 12 and a bag bottom 13, thus forming a pouch 18 of the transport bag. The frame bracket 15 and the two longitudinal edges of the fabric panel of the bag wall 11, 12, 13 define an upper bag opening 181, through which the bag interior 18 is accessible.

Two optional, small-surface lateral walls 14 are arranged on the lateral edges of the fabric panel 11, 12, 13. These lateral walls can also be formed differently or left out completely.

When the empty transport bag 10 (FIG. 5A, solid line) is closed, the bag walls 11, 12, 13 and frame brackets hang down due to their own weight.

To open the empty transport bag 10, the frame bracket 15 is lifted and pivoted upwards (FIG. 5A, dotted line), allowing access to the bag interior 181 via the bag opening 18. A unit of goods 91 can now be inserted into or removed from the bag pouch 18 from the top.

After placing a unit of goods 91 in the pouch 18 of the transport bag 10, the frame bracket 15 is folded down again and thus the transport bag 10 is closed again. The unit of goods 91 slides on the bag wall 11, 12, 13 into a minimum of potential energy.

In this position, the lateral walls 14 prevent the unit of goods 91 from slipping sideways out of the bag pouch 18 of the transport bag 10. If the fabric panel 11, 12, 13 is elastic, the unit of goods is held positively and/or non-positively in the lateral direction by the bag walls which are elastically deformed due to the weight of the unit of goods.

Figure 6:
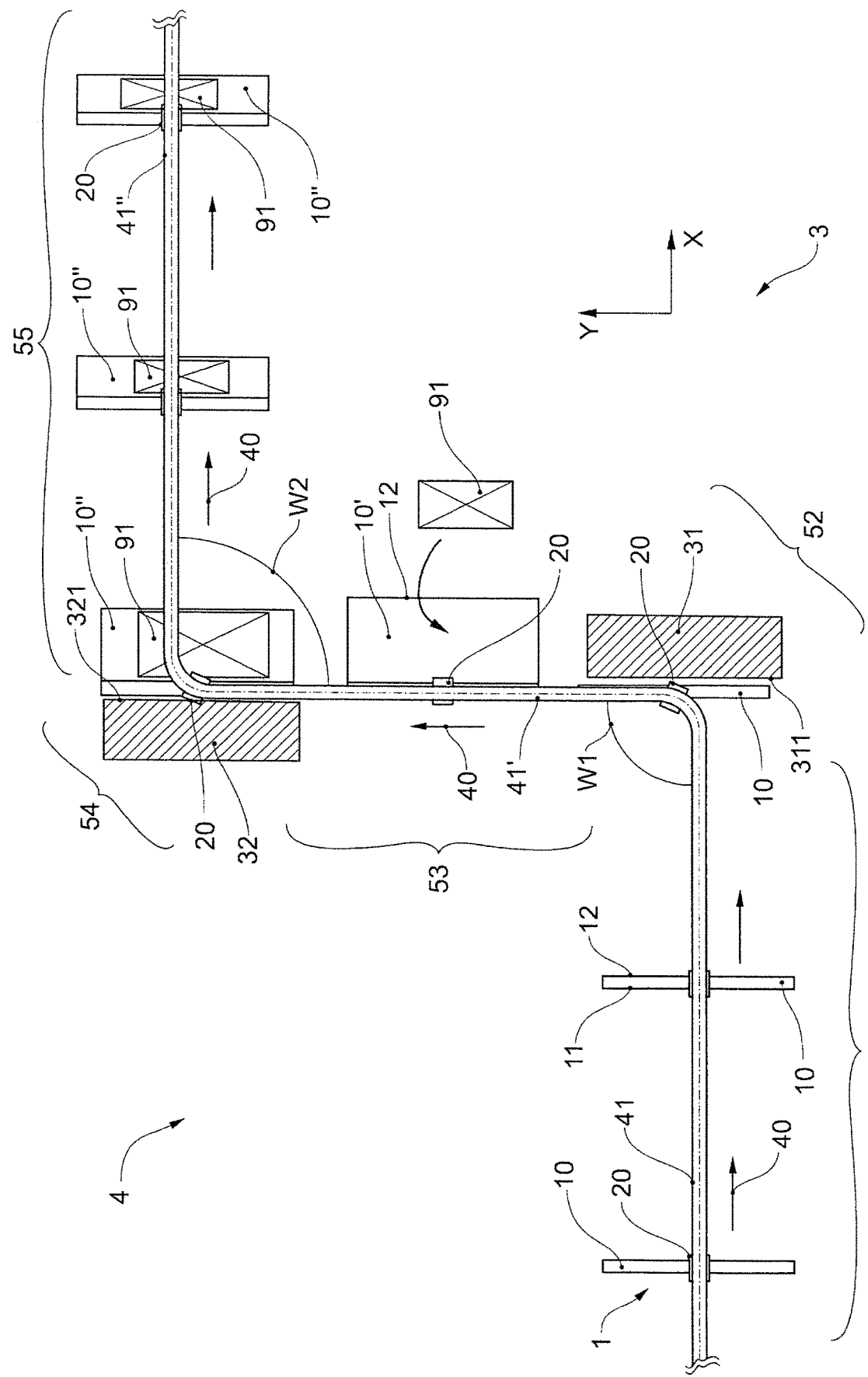
FIG. 6 is a schematic top view of a possible embodiment of a transfer device.

FIG. 6 schematically shows a possible advantageous embodiment of a transfer device 3 in a rail-guided suspended conveyor system 4. FIG. 7 shows a schematic side view of the conveyor units in the two transition regions 52, 54 of the transfer device 3 shown, viewed in the conveying direction in the transfer region.

A running rail 41, 41', 41" of the suspended conveyor system 4 defines a conveyor path which, coming from the left along the x-axis, pivots by 90°, continues along the y-axis, pivots by 90° to the right and then continues along the x-axis to the right. The running rail 41 and the carriage 20 of the conveyor units 1 correspond substantially to the embodiment in FIG. 3. The transport bag 10 and the carrying hook 23 correspond substantially to the embodiment in FIG. 2.

The empty conveyor units 1 arrive with conveying direction 40 to the right in an entry region 51 of the transfer device 3. The empty transport bags 10 are aligned in a space-saving transport orientation transverse to the running rail 41 and conveying direction 40. The entry region 51 is used to provide the conveyor units 1 for the following transfer process.

An advantage of suspended conveyor systems is the possibility of elevating the conveying and intermediate storage of the conveyor units in such a manner that no ground surface is used up in space. The entry region is therefore advantageously preceded by a lowering region (not shown), in which conveyor units supplied at a higher plane are conveyed to the entry region 51 on a descending portion or on a vertical portion of the running rail. This conveying can, for example, be gravitationally driven and free-running.

Conveying of the conveyor units 1 within the transfer device 4 is performed at regular intervals between the individual conveyor units, with the means known for suspended conveyor systems, for example by chain drives, screw drives or also gravitationally driven free-running. The intervals of the successive conveyor units in the entry region 51 need not be identical to the intervals of the transport members in the following transfer region 53 and in the exit region 55, as shown in FIG. 6 only as an example. Particularly in the entry region, for example, a narrower interval can be selected to provide the still empty transport bags in the space-saving transverse place to the conveying direction in a buffer storage in a volume-efficient manner.

In the entry region 51, the running rail 41 is arranged in the normal location, i.e. symmetrically to the vertical axis, in such a manner that the guide channel of the running rail points downwards. In contrast, in a first transition region 52, which contains the curve piece of the running rail connecting the entry region 51 with the transfer region 53, and in the subsequent transfer region 53, the running rail 41', viewed in the conveying direction, is arranged rotated clockwise by a certain angle about the longitudinal axis of the running rail [see FIG. 7A]. The transition between the non-twisted region 41 and the twisted region is advantageously continuous to avoid sudden movements. For clarity, it should be noted that in the curve piece in the first transition region 52 the running rail 41' is thus both twisted about the longitudinal axis thereof and contains a curve having an angle of W1=90°.

As a result of the rotation of the running rail 41' and therefore also of the carriage 20 running thereon, as explained above by means of FIG. 2B, another place of the carrying hook 23 becomes a second stable bearing position in which the suspension hook 17 of the transport bag 10 can rest firmly. In this second bearing position, the suspension hook with the transport bag would be rotated 90° vertically from the first bearing position, in such a manner that the transport bag would be aligned parallel to the conveying direction or to the longitudinal axis of the running rail 41'. In this position, access to an upper opening of the transport bag 10 is not obstructed by the running rail, in such a manner that the transport bag can be filled or emptied more easily through the upper opening.

The transfer of the suspension hook (and therefore the transport bag) between the first stable bearing position and the second stable bearing position can be performed by external actuators, as shown in WO 2018/142242 A1. However, if the running rail were to rotate even more, only the second bearing position would be stable, in such a manner that the suspension hook and transport bag would slide gravitationally into the new stable position.

Instead of transferring the transport bag 10 into the new, second stable bearing position by external actuators or uncontrolled by its own weight, in the transfer device according to the invention the transport bag of the conveyor unit remains in space substantially in the original alignment thereof when passing the transfer device and therefore also during the transition between the first stable bearing position and the second stable bearing position. Instead, the running rail runs in a curve to the left at an angle W1=90°, in such a manner that a carriage 20 of a conveyor unit 1 with the carrying hook 23 thereof rotates or aligns itself with the vertical axis by the same angle W1 when passing the curve.

This has the advantage, among other things, that there is no overswinging of the transport bag during the transition between the first stable bearing position and the second stable bearing position and back. Particularly with filled transport bags, this reduces the mechanical load on the conveyor unit, particularly the carrying hook and the suspension hook. In addition, there is no need to wait for the vibration to be damped or forced with additional means, which increases the possible conveying rate and reduces the complexity of the installation. Also, the rotational impulse of the transport bag does not need to be changed.

In order to keep the transport bag 10 in the original spatial location during the transition from the entry region to the transfer region, a stop member 31 is arranged in the first transition region 52 in the embodiment of the transfer device shown. This has a front surface 311 which is aligned substantially parallel to and faces the bag wall 12 of the transport bags 10 on the left [see FIG. 7A]. In the simplest case, the stop member 31, which is only shown schematically, is configured as a stable front wall made of sheet metal or smooth plastics, for example. In order to dampen the impact of the transport bags 10 on the stop member 31 at higher conveying speeds, if necessary, a damping member can also be provided, for example a foam mat or a damped spring member, which is arranged between the front wall 311 and a carrying structure behind it.

The stop member 31 offers the transport bag 10 a spatial limitation when passing the transfer region 52, which prevents the transport bag from remaining in the first stable bearing position of the carrying hook when the running rail is bent into the transfer region 53. In the example shown, due to the counterforce of the stop member 31, the suspension hook 17 is thus lifted with the transport bag 10 sliding over the elevation between the first and second stable bearing position of the carrying hook, without the transport bag itself having to rotate about the vertical axis. The bag wall 12 rests on the front surface 311. The necessary drive energy is supplied by the drive of the suspended conveyor system. The carrying hook 23 therefore rotates in relation to the suspension hook 17 with the transport bag 10, and not vice versa.

In an alternative embodiment having a larger rotational angle of the running rail, in which the transport bag would automatically slide weight-driven into the new, single stable position of the carrying hook, the stop member 31 also serves as a spatial limitation, wherein in such a case the build-up of a rotational impulse of transport bag is prevented. This is achieved by the front surface 311 blocking a rotation of the bag wall 12 about the vertical axis, in such a manner that the transport bag 10 slides in a controlled manner on the carrying hook into the new stable position weight-driven when passing the stop member 31.

When the transport bag 10 leaves the transition region 52 and passes into the transfer region 53 in conveying direction 40, it is now parallel to the running rail 41' in the transfer region 53, in the second stable bearing position of the carrying hook.

In the transfer region 53 a unit of goods 91 is transferred between the conveyor unit and the transfer device 3. In the embodiment shown, the unit of goods 91 is transferred to the transport bag 10', i.e. the conveyor unit 10' is filled. The transport bag 10' is opened and a piece of goods 91 is inserted through an upper opening of the transport bag into the pouch of the transport bag.

Various technical solutions are known for such a filling process of a transport bag arranged parallel to the conveying direction, as for example in FIG. 5 from US 2008/0208407 A1. In the simplest case, an operator manually places a goods member 91 in the pouch of the transport bag, or the goods member falls from a conveyor belt into the pouch of the transport bag. The filling of the transport bag 10' in the middle of the transfer region 53, as shown in FIG. 6, can only be understood schematically. Particularly the transfer region can be substantially longer than shown. Depending on the method used for the filling process, the transport bag is stopped or moves along the conveying direction 40 during filling.

For the subsequent logistic processing of the filled conveyor units, it is desirable that the transport bags are again aligned transversely to the conveying direction, as in this manner the necessary minimum distance between the successive conveyor units and therefore the space required in the conveying direction is the smallest.

In the example of a conveyor unit discussed, the return to the transverse location can be achieved by moving the running rail, which is twisted about the longitudinal axis, back to the normal location, in which only one stable bearing position, i.e. the first stable bearing position, is available on the carrying hook. The suspension hook with the transport bag thus slides weight-driven on the carrying hook into the stable position. Alternatively, external actuators can be used to turn the transport bag back into the transverse location before the running rail is back in the normal location thereof. In both cases a rotational impulse is applied to the transport bag, which leads to oscillating movements about the vertical axis.

Also in this case it would be advantageous to be able to avoid additional actuators and/or an oscillating movement of the transport bag. In the embodiment shown in FIG. 6, this is achieved by a second transition region 54 following the transfer region 53, where the running rail 41', which has rotated about the longitudinal axis thereof, returns to the normal location thereof before the running rail then executes a curve having an angle W2=90° and then passes into an exit region 55, where the running rail 41" runs away to the right along the x-axis.

Figure 7B:
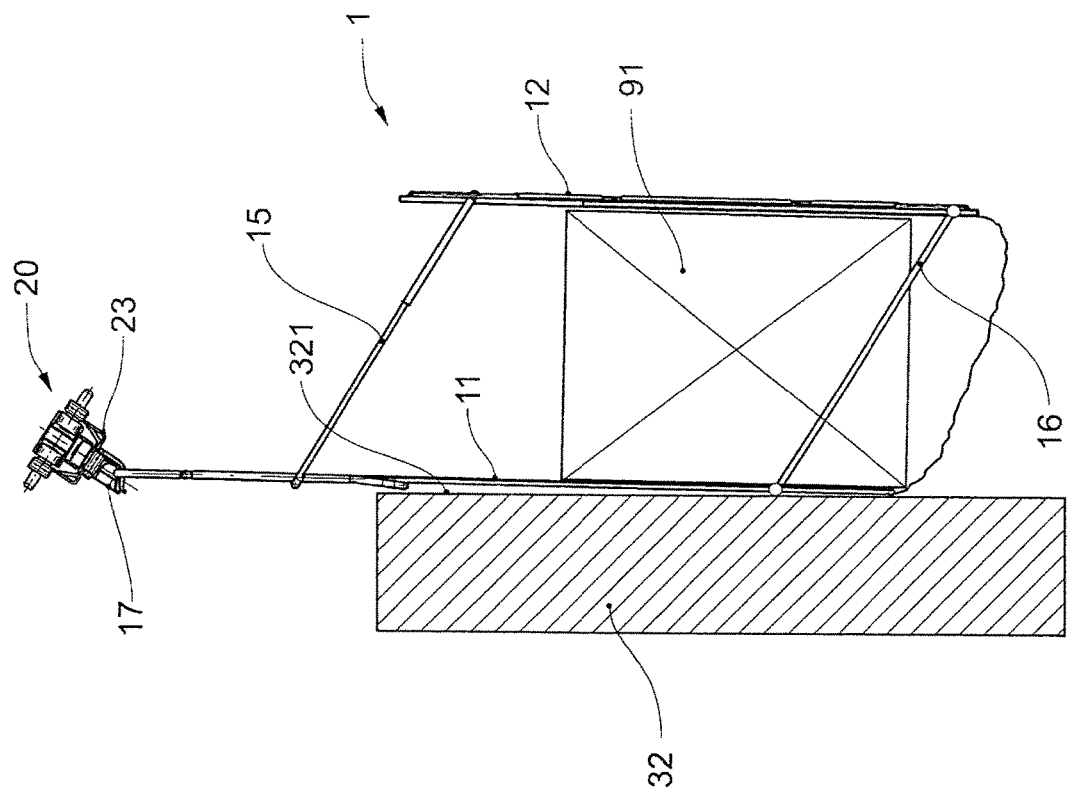
FIG. 7B is a schematic side view of a transport bag, in the second transition region of the aforementioned transfer device.
Figure 7A:
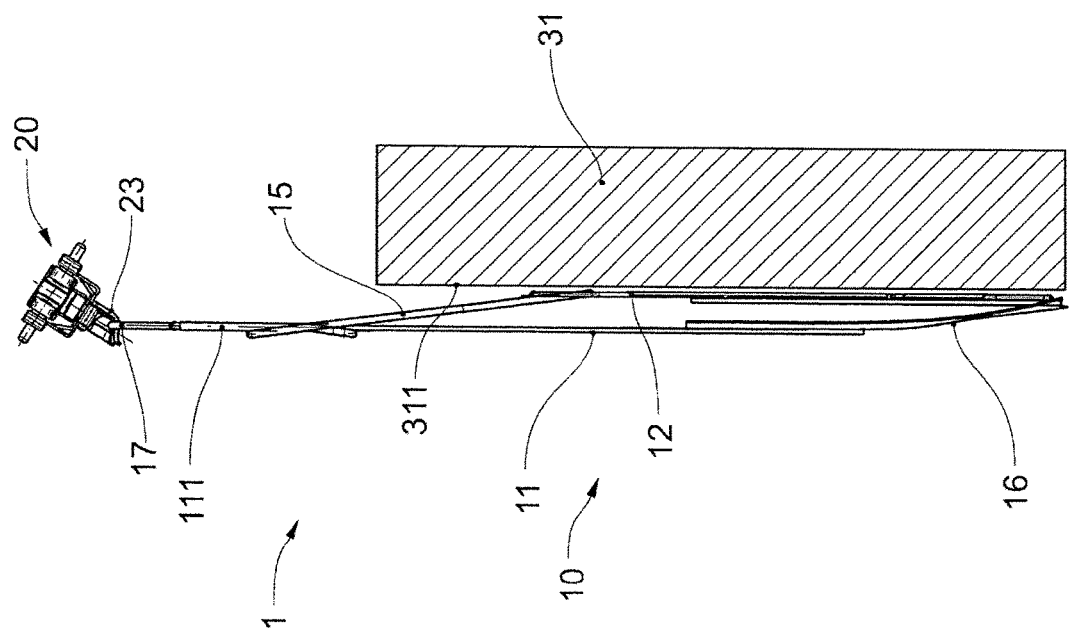
FIG. 7A is a schematic side view of a transport bag, in the first transition region of the transfer device from FIG. 6.

FIG. 7B shows a side view of the filled transport bag 10" as it enters the second transition region 54, viewed in the conveying direction. The running rail and the carriage 20 arranged thereon is still arranged rotated about the longitudinal axis as in the transfer region 53. The transport bag 10" is still aligned parallel to the conveying direction or to the running rail, having the suspension hook 17 in the second stable bearing position of the carrying hook 23 of the carriage 20. A second stop member 32 having a front surface 321 is arranged parallel and substantially flush to the bag wall 11 of the transport bag 10". If the running rail is now transferred from the twisted alignment to the non-twisted normal location, the first stable bearing position becomes the only stable bearing position. However, since the second stop member 32 abuts parallel and substantially flush to the bag wall 11, the transport bag 10" cannot rotate into this stable bearing position.

If the carriage 20 on the running rail now pivots to the right by an angle W2=90° in the transition region 54, the carrying hook 23 is also rotated by the angle W2 about the vertical axis. Without changing the absolute alignment of the transport bag 10" in space, the suspension hook 17 can thus slide weight-driven on the carrying hook into the first stable bearing position. The carrying hook 23 thus rotates in relation to the suspension hook 17 with the transport bag 10", and not vice versa.

In the exit region 55 following the transition region 54, the transport bags 10" are again arranged in the space-saving transverse location to the conveying direction 40 of the running rail 41". The exit region is used to provide the now filled conveyor units 1 for further logistical processing in the suspended conveyor system 4, for example for storage in a storage system or for sorting in a commissioning system.

It is advantageous that the exit region 55 is followed by an ascending region (not shown) in which the running rail rises diagonally or vertically and the conveyor units running thereon are lifted to another plane, for example with a chain conveyor.

In the embodiment of a transfer device 3 shown in FIG. 6, empty transport bags arrive in the entry region 51, are filled with a unit of goods 91 in the transfer region 53, and leave the transfer device 3 in a filled state in the exit region 55. In a possible alternative embodiment of such a transfer device, filled transport bags are instead fed into the entry region, from which the units of goods are then removed in the transfer region, i.e. the transport bags are emptied, before the empty transport bags leave the transfer device for reuse in the suspended conveyor system.

If the transport bags are filled at the beginning, the transport bags are advantageously arranged on the conveyor unit rotated by 180°, as explained below in FIGS. 8 and 9 in the context of another embodiment, in such a manner that the bag wall which is not displaced when the transport bag is opened is the one that runs ahead in the conveying direction and comes into active contact with the first stop member. In this manner, the position of the bag wall in relation to the stop member is clearly defined, even with differently filled transport bags.

Figure 8:
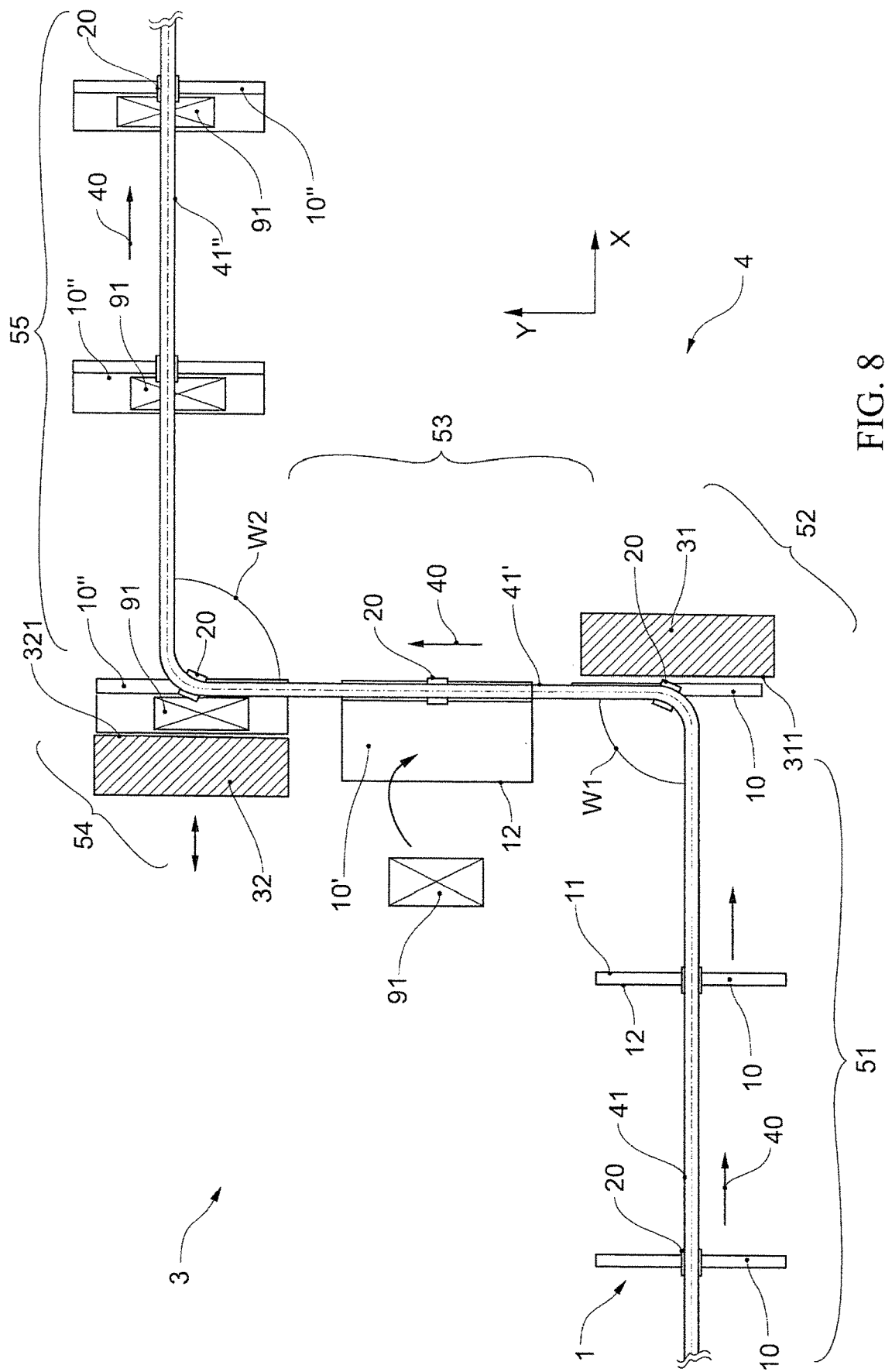
FIG. 8 is a schematic top view of another possible embodiment of a transfer device.
Figure 9B:
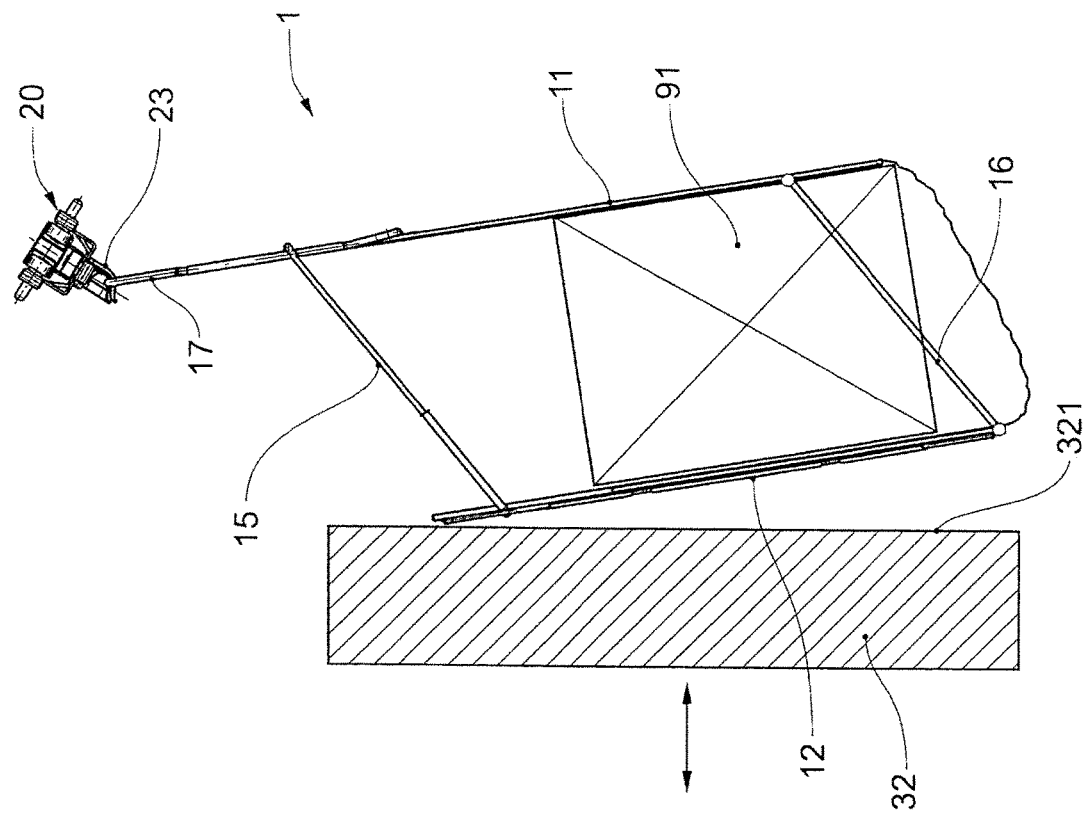
FIG. 9B is a schematic side view of a transport bag, in the second transition region of the aforementioned transfer device.

A further advantageous embodiment of a transfer device 3 is shown in FIGS. 8 and 9. Unless otherwise described below, the various elements of the transfer device 3 and the configuration thereof are substantially the same as the transfer device in FIGS. 6 and 7, in such a manner that no further detailed description is given herein and reference is made instead to the previous embodiments.

Figure 9A:
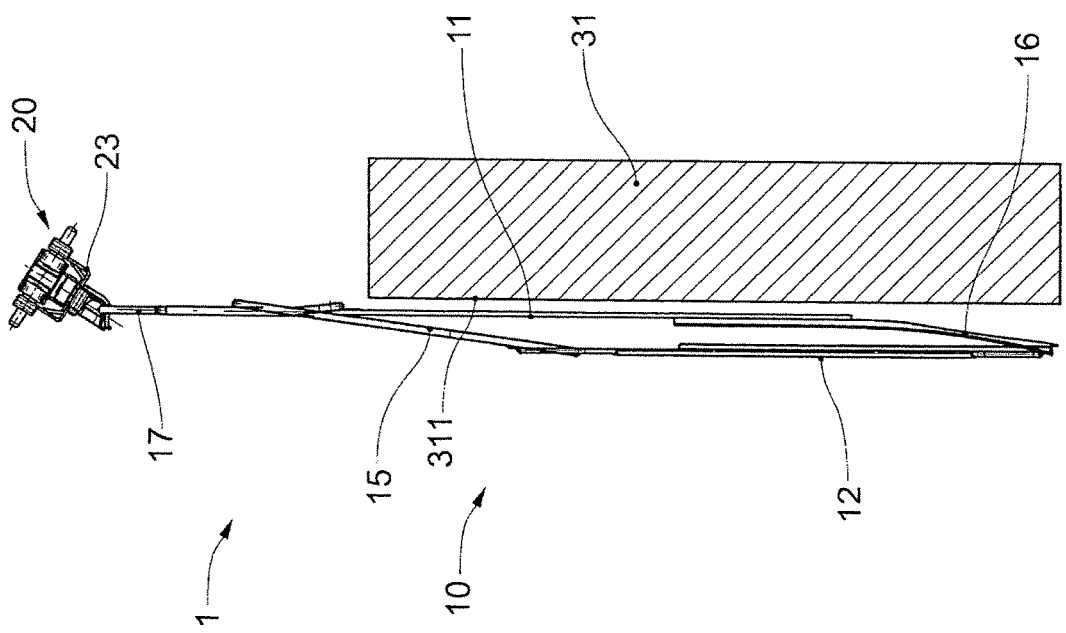
FIG. 9A is a schematic side view of a transport bag, in the first transition region of the transfer device from FIG. 8.

The transport bags 10 are arranged on the conveyor units in such a manner that the bag wall 11 leads in the conveying direction 40 and in the first transition region 52 is operatively connected to the first stop member 31 [see FIG. 9A], which is not displaced when the transport bag is opened. The bag wall 12 therefore follows when viewed in conveying direction 40.

Since therefore in the transfer region 53 the bag wall 12 is on the left, the transport bag 10' is also opened to the left as shown, before the unit of goods 91 is transferred into the transport bag 10'.

Since, depending on the size of the unit of goods 91, there may be a varying distance between the second bag wall 12 and the first bag wall 11 after closing the filled transport bag 10', the resulting different position of the second wall 12 in relation to the running rail 41' must be taken into account. For this purpose, the second stop member 32 is arranged in the second transition region 54 in such a manner that it can be moved along the x-axis, as indicated schematically by the double arrow. The stop member 32 is thus positioned in such a manner that the front surface 321 is in active contact with the second bag wall 12 [see FIG. 9B].

The appropriate positioning of the second stop member 32 can be achieved in various ways. For example, optical means such as light barriers or cameras can be used to determine the position of the bag wall 12 in order to determine the corresponding position of the stop member 32 and move it to the corresponding position. It is also possible to arrange distance sensors or contact sensors on the stop member 32.

In yet another embodiment, the transport bag 10' is kept fully open after filling along the conveyor path until it reaches the transition region 54. In this manner, the position of the bag wall 12 is defined by the fixed geometry of the fully opened transport bag.

Optionally, it is also possible for the second stop member 32 to travel with the conveyor unit 1 in the conveying direction over a short distance if the latter pivots onto the outgoing running rail 41" in the transition region 54. The travel speed of the stop member 32 along the x-axis advantageously corresponds to the speed vector component of the carriage along the x-axis, in such a manner that the transport bag is permanently supported by the front surface 321 of the stop member 32 over the corresponding distance while the carriage pivots.

Figure 10:
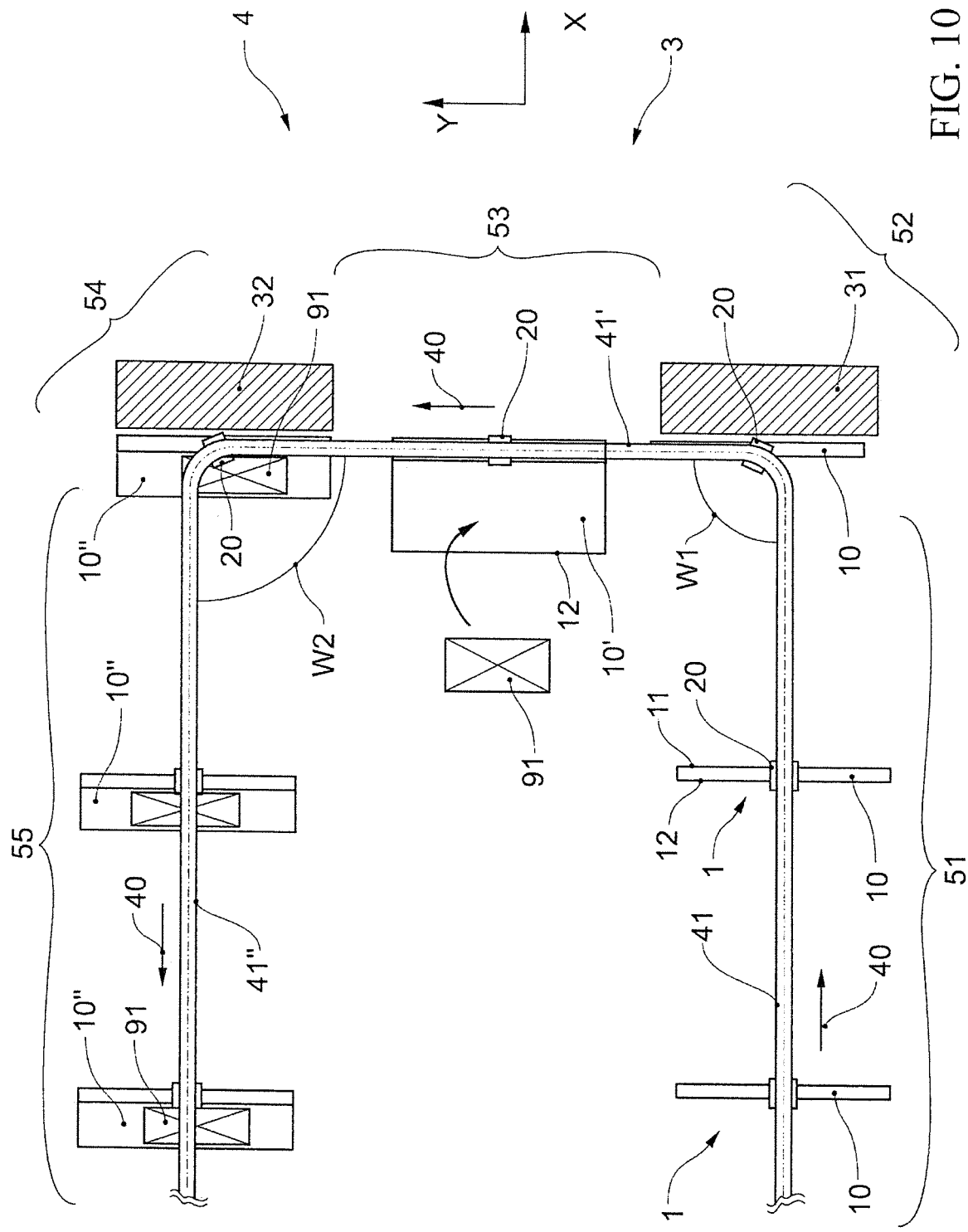
FIG. 10 is a schematic top view of a further possible embodiment of a transfer device.

Yet a further possible embodiment of a transfer device is shown in FIG. 10. Unless otherwise described below, the various elements of the transfer device 3 and the configuration thereof are substantially the same as the transfer device from FIGS. 8 and 9, in such a manner that reference is also made herein to the previous embodiments.

As in the embodiment from FIG. 8, the bag wall 11 runs ahead in conveying direction 40 and enters into operative connection with the stop member 31 in the transition region 52. FIG. 9A is also applicable to FIG. 10 accordingly. In the transfer region 53 the transport bag 10' is also opened to the left.

In contrast to FIG. 8, the running rail in the exit region 55 runs to the left. The carriage 20 thus pivots to the left in a 90° curve in the transition region 54. Accordingly, the second stop member 32 is arranged on the right side, where it enters into operative connection with the first bag wall 11, as in the first transition region 52. This has the advantage that the position of the bag wall 11 is clearly defined in both transition regions 31, 32 independent of the filling status and the size of the goods member 91 in the transport bag, which allows a static arrangement of the stop members.

Such a transfer device can also be used to unload conveyor units without the need to change the configuration, except of course for an apparatus in the transfer region.

In the embodiment of a transfer device discussed above, the static first and second stop members 31, 32 can be configured in such a manner that they follow the movement of the transport bags along the x-axis when the carriage pivots into the first or into the second transition region 52, 54. Such a movement can be realized without linear drive, for example by applying a spring force to the stop member 31, 32 in a direction along the x-axis, which presses the stop member onto a support member defining a basic position. A suitably formed rotating curve disc presses against the spring force in the x-direction onto the stop member and thus moves the stop member 31, 32 from the basic position into the desired working position. The rotational movement of the curve disc is advantageously fixed to the drive of the carriages 20 of the conveyor units 1 in the transition region, in such a manner that the movement of the stop members 31, 32 is exactly synchronized with the movement of the carriage 20 in the transition region without the need for a complex control.

Instead of the carrying hook suspension system used in the variants of transfer devices discussed above, alternative systems such as those described in FIGS. 6 to 9 of WO 2018/142242 A1 can also be used. In such a case no rotation of the running rail is necessary. The stop member 31 in the first transition region 52 is then used to prevent a rotation of the transport bags when the carriages on the running rail are pivoted by 90° in such a manner that the carrying hook rotates about the vertical axis, while again the suspension hook with the transport bag substantially maintains the alignment in space. In the second transition region 54 an actuator may be necessary to rotate the transport bag.

In each of the disclosed transfer devices, two transition regions were used in which the carriage made a curve. Alternatively, it is also possible to omit the first or second transition region, wherein in this case the transport bags are rotated in relation to the conveying direction either by external actuators or due to their own weight.

In the embodiment of the transfer device 3 as shown in FIG. 10, the transport bag 10 changes the running direction after passing the second transition region 54. This means that the bag wall originally leading in the conveying direction in the entry region 51 becomes the following bag wall in the exit region 55, and vice versa.

For the transport bags discussed so far, this leads to a complication in relation to the further treatment of the transport bags in the suspended conveyor system, as these transport bags can be present in two different alignments transverse to the conveying direction (first 11 or second 12 bag wall as a leading wall). A control installation can take this into account by storing the current orientation in relation to the conveying direction for all transport bags in the suspended conveyor system, in such a manner that the individual transport bags can be processed correctly.

In an advantageous variant, all filled transport bags have the same specific orientation, and all empty transport bags have the opposite orientation.

Alternatively, devices can be provided which rotate the conveyor units, or depending on the design of the carrying hook/suspension hook system also only the transport bags, by 180° about the vertical axis, for example before or after the transfer process. It is advantageous to rotate the empty conveyor units or transport bags, as less mass has to be moved.

Figures 11A, 11B:
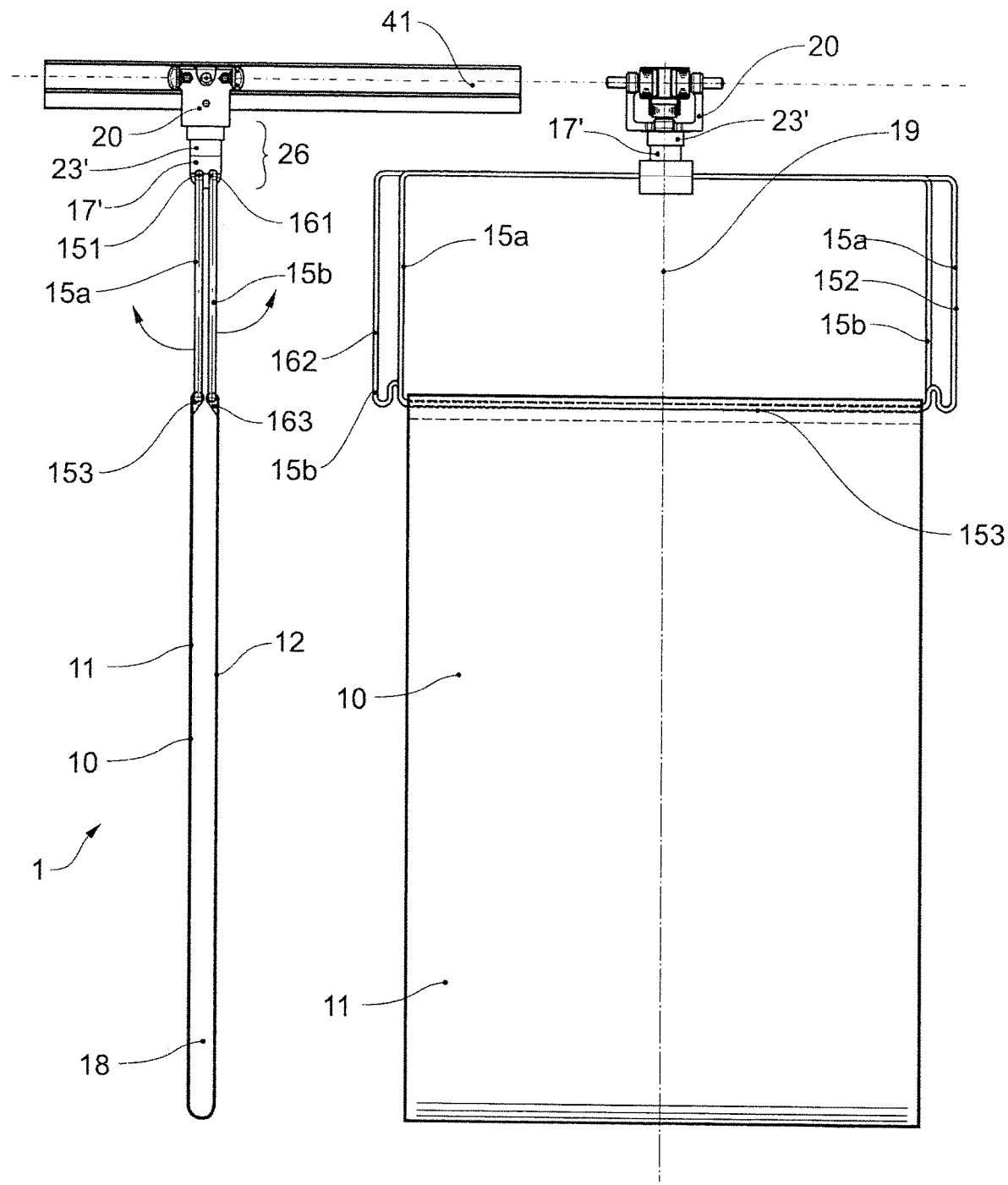
FIG. 11A is a schematic representation of a further embodiment of an advantageous transport bag conveyor unit for a rail-guided suspended conveyor system, as an empty bag in the closed state, in a side view.
FIG. 11B is a schematic representation of a further embodiment of an advantageous transport bag conveyor unit for a rail-guided suspended conveyor system, as an empty bag in the closed state, in a front view facing against the conveying direction.

It is advantageous that the transfer device according to the invention described in FIG. 10 can be operated without additional control or handling effort. FIGS. 11a and 11b show a conveyor unit 1 with an advantageous embodiment of a transport bag 10, which can be operated identically from both sides, in such a manner that the orientation of the transport bag in relation to a conveying direction is irrelevant.

A carriage 20 is rollingly mounted on a running rail 41 of a conveyor system. The carriage 20 and the running rail 41 correspond to the carriage and the running rail from FIG. 3, wherein other suspended conveyor systems can also be used, for example those from FIGS. 1 and 2.

A carrying hook 23' is arranged on the carriage 20 on the underside facing away from the running rail 41, in which a suspension hook 17' of the transport bag 10 is suspended and pivoted, in such a manner that the carrying hook and suspension hook together form a rotating joint 26. For example, the rotating joint may be freely rotatable, or it may have two or a plurality of stable positions, as known for example from FIGS. 6 to 9 in WO 2018/142242 A1.

To save space, the transport bag 10 can be aligned transversely to the conveying direction or to the running rail 41, as shown in FIG. 11a, 11b, or (not shown) parallel to the conveying direction or to the running rail 41, analogous to the transport bags discussed so far.

Two joint members 151, 161 are arranged on the suspension hook 17', in each of which a frame bracket 15a, 15b is arranged to pivot about a horizontal pivoting axis. At the end of the two frame brackets 15a, 15b opposite the joint member 151, 161, the two edges are each arranged at the longitudinal ends of a panel made of a flexible material, for example a textile fabric or a film, and are each connected to one of the two frame brackets 151, 161. It is advantageous that the frame bracket is pivotably arranged in a bracket 153, 163 at one longitudinal end of the panel of the wall. The fabric panel thus forms a first bag wall 11 and a second bag wall 12 and a bag bottom connecting them, which together form a pouch 18 of the transport bag 10. In this interior 18 of the transport bag, a unit of goods is arranged during a transport process.

When the transport bag 10 is empty, the frame brackets 15a, 15b and the bag wall hang straight down due to their own weight, as can be seen in FIG. 11a.

Each of the two frame brackets 15a, 15b has a region 152, 162 of the frame bracket projecting laterally beyond the outer edge of the bag wall 11, 12 on the right side when viewed in a direction perpendicular to the associated bag wall 11, 12, while on the left side the frame bracket does not project laterally beyond the outer edge of the bag wall. These two projecting frame bracket portions 152, 162 are intended as the engagement region of an actuator device with which the frame brackets 15a, 15b can be temporarily pivoted about their rotational axis 19 on the joint member 151, 161. In this manner, by pivoting one of the frame brackets 15a, 15b upwards, a top bag opening or a lateral bag opening is released through which the transport bag can be loaded or unloaded.

Due to the advantageous design of the frame brackets 15a, 15b and the engagement regions 152, 162 thereof, the transport bag 10 has a 2-fold rotational symmetry, i.e. about the vertical rotational axis 19 of the rotating joint 26, but no mirror symmetry. As a result, for all relative arrangements of the transport bag in relation to the conveying direction, the transport bag can be arranged in two orientations each, which differ only in the identity of the two frame brackets 15a, 15b and the bag walls 11, 12. This has the advantage that an actuator device can be configured in such a manner that it can handle the two frame brackets differently, regardless of which of the two possible orientations of the transport bag is present. For example, an actuator device can selectively pivot one frame bracket upwards while the other frame bracket is not actuated or optionally fixed or pivoted backwards. This can be achieved, for example, by ensuring that a gripping member of an actuator can only grip the projecting engagement region of the frame bracket.

The embodiment of the engagement regions 152, 162 shown in FIG. 11a, 11b is only one of the possibilities. Further variants result for a person skilled in the art, in which there is also a 2-fold rotational symmetry, and which allow a specific actuation of the frame brackets.

Figure 17:
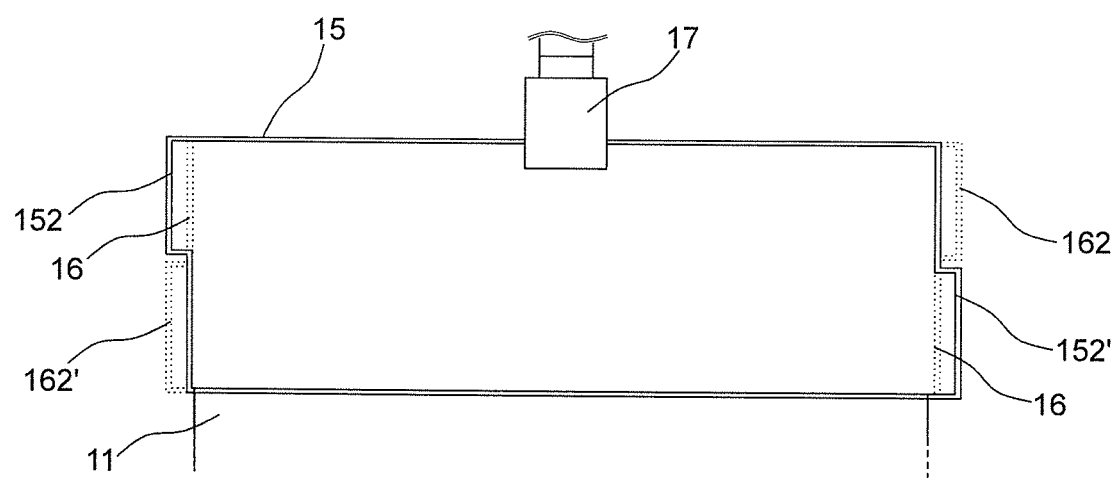
FIG. 17 is a schematic representation of an advantageous transport bag conveyor unit in analogy to FIG. 11, facing against the conveying direction.

For example, when looking toward the wall of the transport bag, on the right side an upper section of a frame bracket 15, 16 can be configured as a projecting engagement region 152, 162. On the left side, a lower section of the same frame bracket, different from the upper section, can be configured as a projecting engagement region 152', 162'. Such an embodiment is schematically shown in FIG. 17, looking toward the first frame bracket 15. In the line of sight, the second frame bracket 16 (shown by dashed lines for better distinction) lies behind the first frame bracket 15. This advantageous embodiment enables simultaneous actuation of each frame bracket on both lateral sides. This is mechanically advantageous particularly for heavier bag contents due to reduced shear forces.

The wall of such an advantageous transport bag can also be rigidly configured over certain regions, wherein the transport bag still substantially has a 2-fold rotational symmetry. For example, a rigid first wall and a rigid second wall can be connected by a flexible bag bottom.

Even though the advantageous transport bags discussed above are of course particularly advantageous for the transfer device 3 from FIG. 10, these transport bags can also be used for the other transfer devices.

Figure 12:
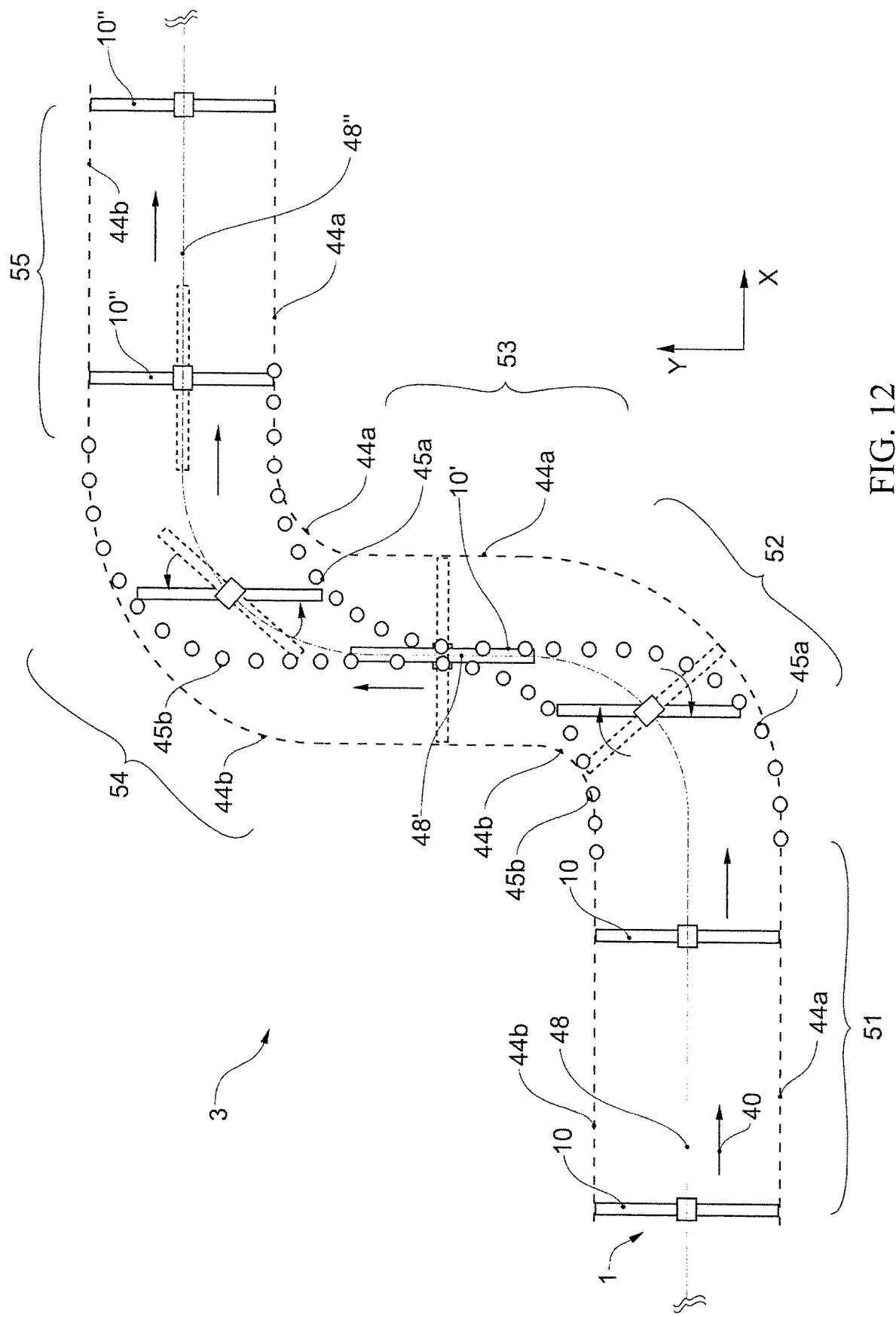
FIG. 12 is a schematic top view of a generalized embodiment of a transfer device.

The basic principle of the transfer devices discussed so far, according to which the alignment of the transport bags in relation to the space remains substantially the same, while instead the alignment of the carriage of the conveyor unit changes due to the arrangement of the running rail, can also be realized with a schematically generalized transfer device according to FIG. 12.

Analogous to FIGS. 6 and 8, transport bags 10 run on a conveyor path 48 along the x-axis from the left into an entry region 51, pass through a first transition region 52, in which the conveyor path of the conveyor units pivots by 90° to the left until the conveyor path 48' runs in a transfer region 53 along the y-axis. After the transfer process has taken place there, the conveyor path 48' pivots by 90° to the right in a subsequent second transition region 54, until finally the conveyor path 48" in an exit region 55 runs along the x-axis again.

In FIG. 12, the transport bags 10 of the conveyor units 1 are only shown schematically. Particularly filled and empty transport bags are not distinguished. The transfer region 53 is shown very shortened in the direction of the y-axis.

The dotted lines 44a, 44b show a hypothetical outer shell curve of the transport bags 10, if they would move in the conveying direction 40 along the conveyor path 48, 48', 48", while maintaining their relative alignment to the conveyor path. The curves 44a, 44b are substantially defined by the fact that with the same center point as the circular curve of the conveyor path 48 a curve 44a and a curve 44b are defined respectively, with a curve radius R+d/2 and R−d/2, wherein R is the curve radius of the conveyor path curve and d is the width of the transport bags.

The dotted lines 45a, 45b in turn show a hypothetical outer shell curve of the transport bags 10, if these were to move in the conveying direction 40 along the conveyor path 48, 48', 48", while maintaining their absolute alignment in space parallel to the y-axis. The curves 45a, 45b are substantially defined by the fact that a curve 45a and a curve 45b are defined with the same radius R as the curve of the conveyor path 48, wherein this center point is shifted relative to the center of the conveyor path curve along the y-axis by d/2 in the y-direction downwards and upwards, respectively.

In this general example, the conveyor units are also configured in such a manner that the carrying hook has more than one stable bearing position for the suspension hook with the transport bag, similar to the examples of carrying hook/suspension hook systems already discussed.

If a guide member is now arranged in the transition region 52 along at least a part of the right shell curve 45a, this results in a spatial limitation for the transport bag, i.e. for the right outer edge of the transport bag 10 viewed in the conveying direction 40. Such a guide member can, for example, be implemented as a sequence of vertical freely rotating or driven rollers, or as a guide plate or guide rail. When passing the transition region, the guide element exerts a counterforce against the x-axis on the right outer edge of the transport bag, in such a manner that the transport bag is forced to remain in the same alignment in space, while at the same time the transport bag is rotated in relation to the carriage or to the conveyor path. Finally, the transport bag 10' is parallel to the conveyor path, in the second stable bearing position of the carrying hook.

The first stop member 31 from the embodiment already discussed is substantially a variant of such a guide member along the upper part of the right shell curve 45a and with a comparatively tight curve radius in the transition region.

As soon as a guide member along the right shell curve 45a has caused a certain rotational angle of the transport bag in relation to the carriage or the carrying hook, a guide member along the opposite left shell curve 45b can optionally also exert a counterforce on the left outer edge of the transport bag and thus cause a rotation of the transport bag in relation to the carriage. Since the left outer edge runs ahead, such a guide member should avoid tilting. A smooth guide plate, for example, is suitable for this purpose.

Due to the angle of attack, in a first region of the curve in the transition region 52 a guide member along the right shell curve 45a is more effective, and in a subsequent second region of the curve a guide member along the left shell curve 45b is more effective.

Figures 13, 14:
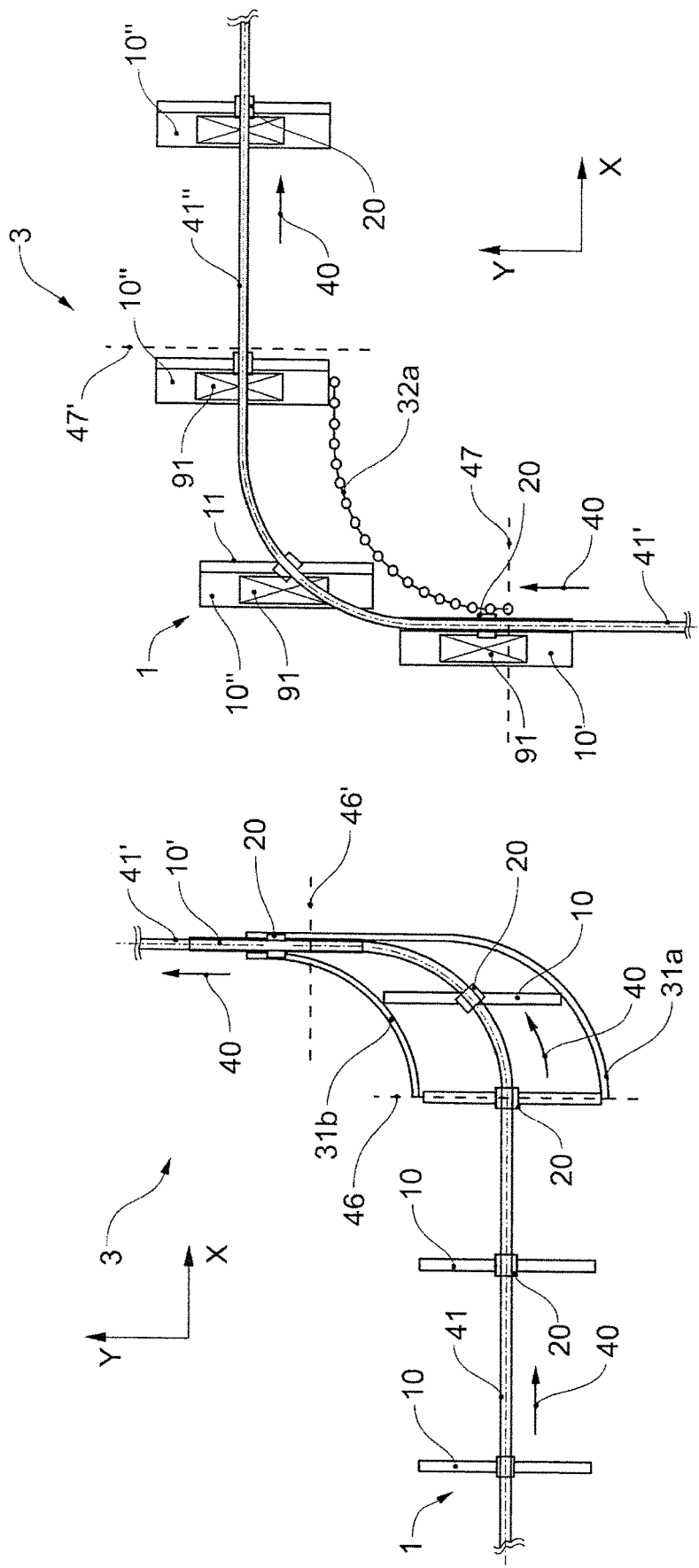
FIG. 13 is a schematic top view of a further embodiment of a transfer device, in the transition region between the entry region and the transfer region.
FIG. 14 is a schematic top view of yet another embodiment of a transfer device, in the transition region between the transfer region and the exit region.

A specific embodiment of a transfer device having guide members is shown in FIG. 13. The conveyor units 1 having carriages 20 and empty transport bags 10 arrive at the entry region along the x-axis from the left before they pass into the first transition region (beginning 46 of the transition region marked by a dotted line). There, the running rail 41 runs along a 90° curve before it passes into the transfer region (beginning 46' marked by a dotted line), and there along the y-axis 41' runs straight forward.

An outer guide member 31a in the form of a guide plate is arranged along a right shell curve analogous to the curve 45a in FIG. 12 and, as it passes through the conveyor unit 1, continuously exerts a counterforce on the right outer edge of the transport bag 10 in such a manner that the latter rotates continuously about the vertical axis relative to the running rail 41 and the carriage 20 while maintaining the same alignment in space until finally the suspension hook has reached the second stable bearing position of the carrying hook and the transport bag 10 is parallel to the running rail 41'.

An inner guide member 31b in the form of a guide plate is arranged along a left shell curve analogous to the curve 45b in FIG. 12 and exerts a counterforce on the left outer edge of the transport bag 10 as it passes the conveyor unit.

The inner guide plate 31b is redundant in the configuration shown, and therefore optional. However, a combination of the inner guide plate 31b and the outer guide plate 31a has the advantage that the force applied to the transport bag is more symmetrical in relation to the vertical rotational axis through the carrying hook, and can be better controlled than with only one guide plate.

When the conveyor unit in FIG. 12 leaves the transfer region 53 and passes into the second transition region 54, as in the previous embodiments, the carrying hook of the carriage of the conveyor unit is brought into a configuration in which the suspension hook with the transport bag slides weight-driven back into the first stable bearing position. In this case, guide members along the shell curves 45a, 45b serve as spatial borders. The guide members exert a counterforce on the transport bags, which ensures that the rotational movement of the transport bags does not run uncontrolled and that the transport bag maintains the absolute alignment thereof in space. A guide member along the right shell curve 45a can again be configured, for example, as a guide plate or guide rail, or also as an arrangement of vertically rotating rollers. A guide member along the left shell curve 45b is advantageously configured as a smooth guide plate in order to avoid canting of the leading left outer edge of the transport bag 10".

Finally, at the exit of the transition region 54, the transport bag 10" is again in the stable location transverse to the conveyor path 48" and passes into the exit region 55.

The second stop member 32 from the embodiment already discussed is substantially a variant of such a guide member along a lower region of the right shell curve 45b and having a comparatively tight curve radius in the transition region.

A specific embodiment of such a transfer device is shown schematically in FIG. 14. Coming from the transfer region, the running rail 41' runs along the y-axis and enters a second transition region (beginning 47 marked with a dotted line), in which the running rail makes a 90° curve to the right. Finally, the running rail 41" enters the exit region (beginning 47' marked by a dotted line), where it runs along the x-axis to the right.

At the beginning 47 of the second transition region, the running rail 41' changes from the twisted alignment to the normal location, in such a manner that the carrying hook of a passing carriage 20 is again in such a position that only a stable bearing position of the suspension hook and the associated transport bag is possible, i.e. transverse to the running rail.

A guide member 32a in the form of a series of rollers freely rotating about the vertical axis along a curve analogous to the right shell curve 45a in FIG. 12 defines a spatial limit for the rotational movement of the filled transport bag. The right outer edge of the leading bag wall 11 of the filled transport bag 10" slides on the roller panel 32a, wherein the rotational movements of the transport bag and the vertical axis are always limited in such a manner that the alignment of the transport bag 10" in space remains the same. This prevents the build-up of a rotational impulse and the transport bag from oscillating.

Since the bag wall 11 interacts with the guide member 32a which is not moved when the transport bag is opened and closed, the filling status of the conveyor member is not relevant for the function of the inner guide member 32a.

Figure 15:
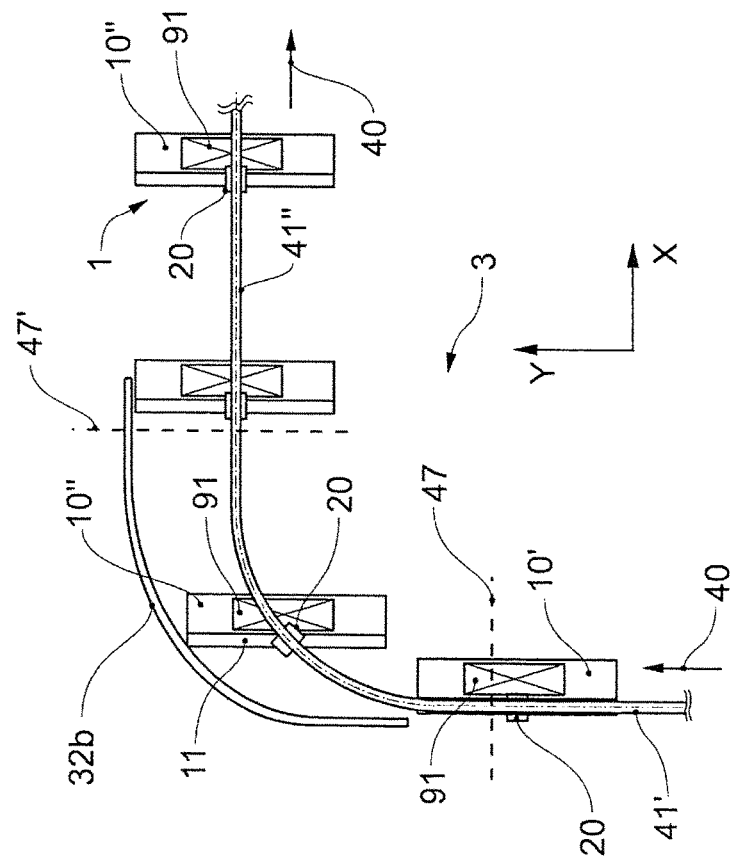
FIG. 15 is a schematic top view of a further embodiment of a transfer device, in the transition region between the transfer region and the exit region.

A further advantageous embodiment of a transfer device is shown in FIG. 15. Analogous to the previous example in FIG. 14, a guide member the rotation of the transport bag 10', wherein this time the guide member 32b is designed as a guide plate along a curve analogous to the left shell curve 45b in FIG. 12.

The transport bag is arranged on the carriage rotated by 180° in such a manner that the bag wall 11 follows in the conveying direction 40. In this configuration, the left outer edge of the bag wall 11 slides on the outer guide plate 32b.

Figure 16A:
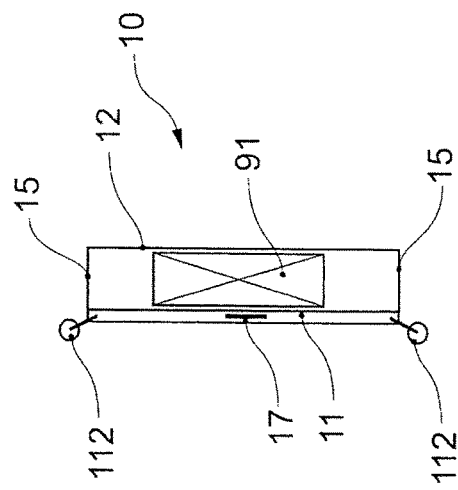
FIG. 16A is a schematic representation of an advantageous transport bag, particularly suitable for the transfer device in FIGS. 14 and 15, in plain view.
Figure 16B:
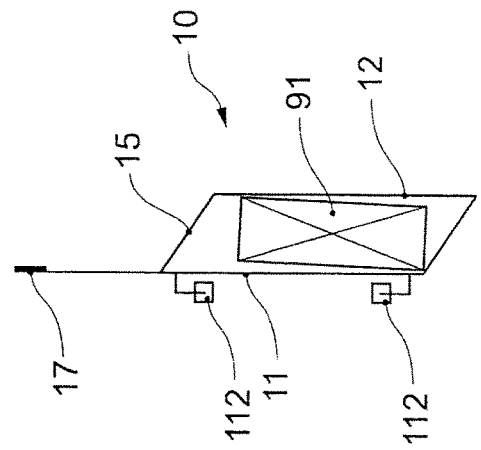
FIG. 16B is a schematic representation of an advantageous transport bag, particularly suitable for the transfer device in FIGS. 14 and 15, in cross section.

FIG. 16 shows an advantageous variant of a transport bag 10, which is particularly suitable for use in a transfer device having guide plates 32a, 32b. At the two outer edges of the bag wall 11 of the transport bag 10 there are four rollers 112, which can rotate freely about the vertical axis. These rollers are arranged in relation to the bag wall 11 in such a manner that the rollers 112 roll on the guide plates 32a, 32b. The outer edges of the transport bag 10 are therefore protected, which increases the service life of the transport bag.

The present invention is not limited in scope to the specific embodiments described herein. Rather, for a person skilled in the art, the description and the corresponding figures result in various further modifications of the present invention in addition to the examples disclosed herein, which also fall within the scope of the claims. In addition, various references are cited in the description, the disclosure content of which is hereby included in the entirety thereof by reference in the description.

It is claimed:

1. A transport bag for a suspended conveyor system, a rail-guided conveyor system or a transport chain conveyor system, the transport bag comprising:
    a conveyor member;
    a transport bag having a receiving region for receiving one or a plurality of units of goods;
    wherein the transport bag is attached, via a suspension means, rotatably about a vertical rotational axis in a suspended manner to a carrying means of the conveyor member; and two frame brackets which are pivotally connected to the suspension means wherein the two frame brackets are substantially 2-fold rotationally symmetrical to one another about the vertical rotational axis, but not mirror symmetrical to one another.

2. The transport bag according to claim 1, wherein the conveyor member comprises a carriage of the rail-guided conveyor system or a conveyor chain link of the transport chain conveyor system.

3. The transport bag according to claim 1, wherein the transport bag has at least one wall which defines the receiving region of the transport bag and which is pivotally connected at two edges of the wall to a respective region of one of the two frame brackets facing away from the suspension means.

4. The transport bag according to claim 3, wherein the at least one wall is realized as a carrying loop in the form of a panel made of a flexible material, for example a textile fabric or a foil.

5. The transport bag according to claim 3, wherein a first rigid wall and a second rigid wall are connected by a flexible base of the bag.

6. The transport bag according to claim 1, wherein a first frame bracket of the two frame brackets has a first engagement region adapted to be engaged by an actuator for pivoting the first frame bracket; and
a second frame bracket of the two frame brackets has a second engagement region adapted to be engaged by an actuator for pivoting the second frame bracket; and
the first engagement region of the first frame bracket is arranged about the rotational axis in 2-fold rotational symmetry with the second engagement region of the second frame bracket.

7. The transport bag according to claim 6, wherein the transport bag has at least one wall which defines the receiving region of the transport bag, and which is pivotally connected at two edges of the wall to a respective region of one of the two frame brackets facing away from the suspension means; the first engagement region, when looking perpendicular toward the at least one wall, protrudes on a first side over an outer edge of the at least one wall; and the second engagement region protrudes on a second side, opposite to the first side, over the outer edge of the at least one wall.

8. The transport bag according to claim 7, wherein the first engagement region protrudes laterally on the first side over the outer edge of the at least one wall; and the second engagement region protrudes laterally on the second side over the outer edge of the at least one wall.

9. The transport bag according to claim 6, wherein the transport bag has at least one wall which defines the receiving region of the transport bag, and which is pivotally connected at two edges of the wall to a respective region of one of the two frame brackets facing away from the suspension means;
the first engagement region, when looking perpendicular toward the at least one wall, protrudes on a first side in a first region over an outer edge of the at least one wall;
the first engagement region protrudes on a second side, opposite to the first side, in a second region over the outer edge of the at least one wall;
the second engagement region protrudes on the first side in a second region over the outer edge of the at least one wall; and
the second engagement region protrudes on the second side in a first region over the outer edge of the at least one wall.

10. The transport bag according to claim 6, wherein the first engagement region is realized as one or more sections of the first frame bracket; and the second engagement region is realized as one or more sections of the second frame bracket.

11. The transport bag according to claim 6, wherein the first engagement region and the second engagement region are realized as protruding rigid plates or pins attached to the frame brackets.

12. The transport bag according to claim 1, wherein the transport bag is connected to the conveyor member via a rotating joint in such a manner that it can rotate about the vertical rotational axis.

13. The transport bag according to claim 1, wherein the transport bag has a suspension hook; the conveyor member has a carrying hook; and the suspension hook is suspended in the carrying hook;
wherein the suspension hook can assume at least two stable bearing positions in the carrying hook; and
wherein the suspension hook in a first stable bearing position is rotated through a certain angle relative to the suspension hook in a second stable bearing position.

14. The transport bag according to claim 13, wherein the carrying hook of the conveyor member is configured in such a manner that
in a certain spatial orientation of the carrying hook the suspension hook of the transport bag can assume a first stable bearing position in which the suspension hook is aligned in a first plane; and
in the same spatial orientation of the carrying hook the suspension hook can assume a second stable bearing position in which the suspension hook is aligned in a second plane;
wherein the first bearing position and the second bearing position correspond to local minima of the potential energy of the suspended transport bag; and
wherein the suspension hook is transferable back and forth between the first stable bearing position and the second stable bearing position by rotating the suspension hook through a certain rotational angle.

* * * * *